Fig. 3.

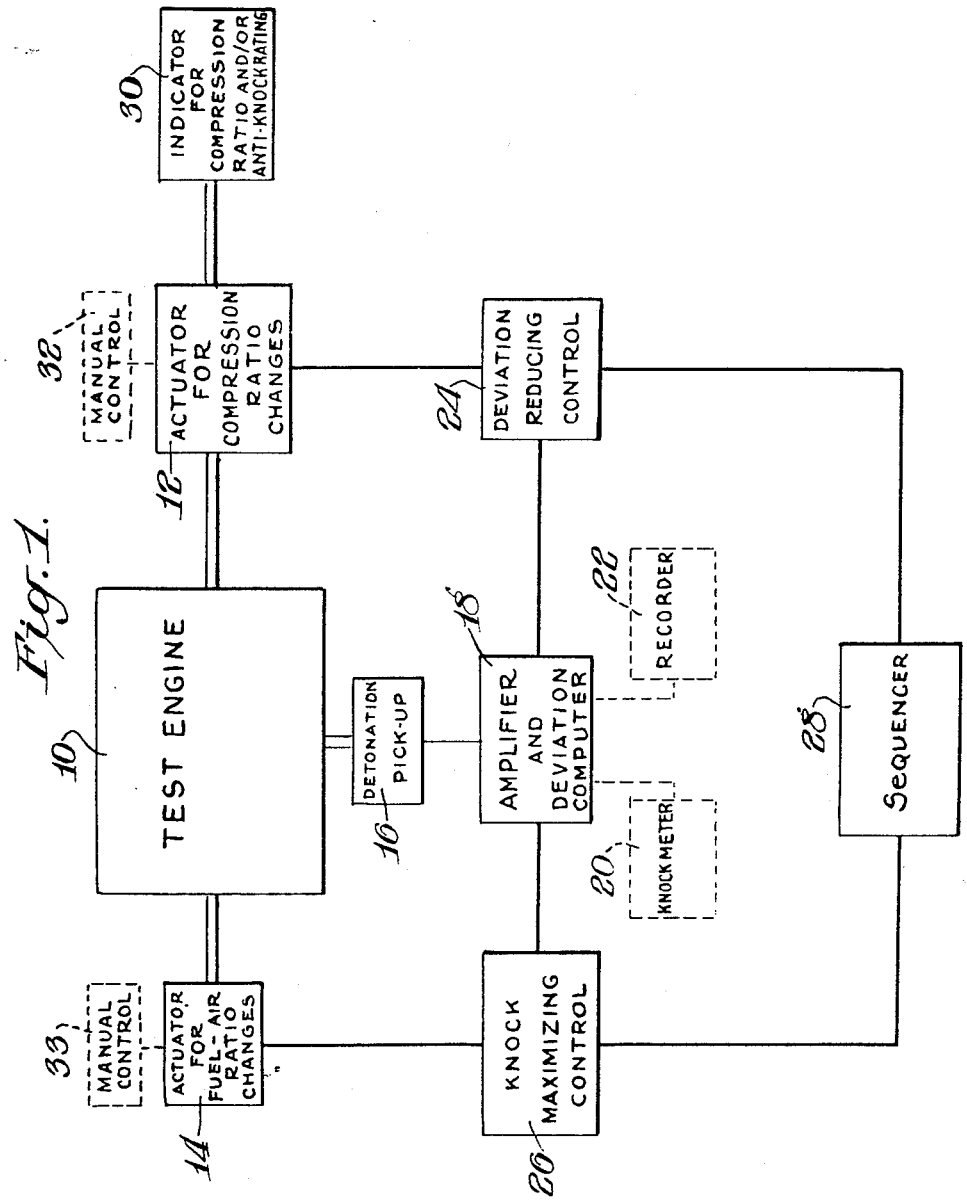

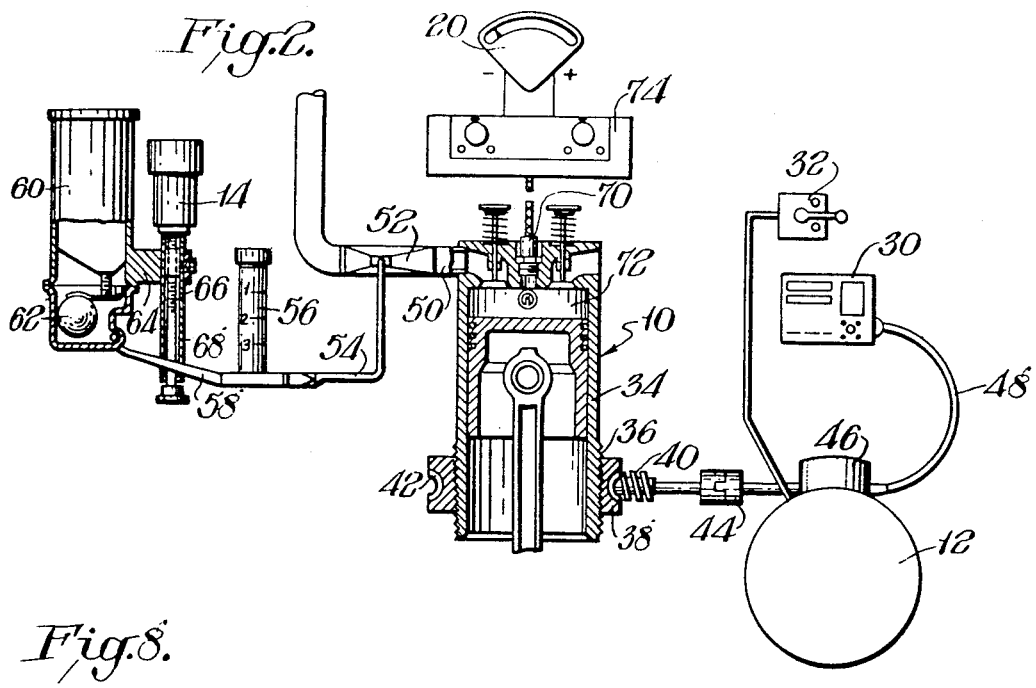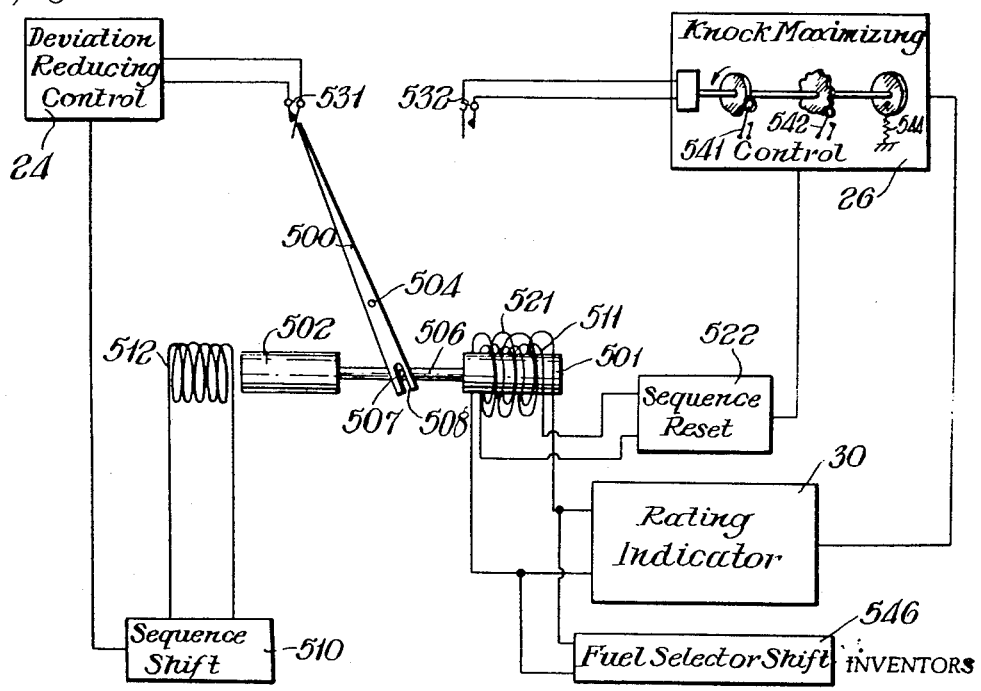

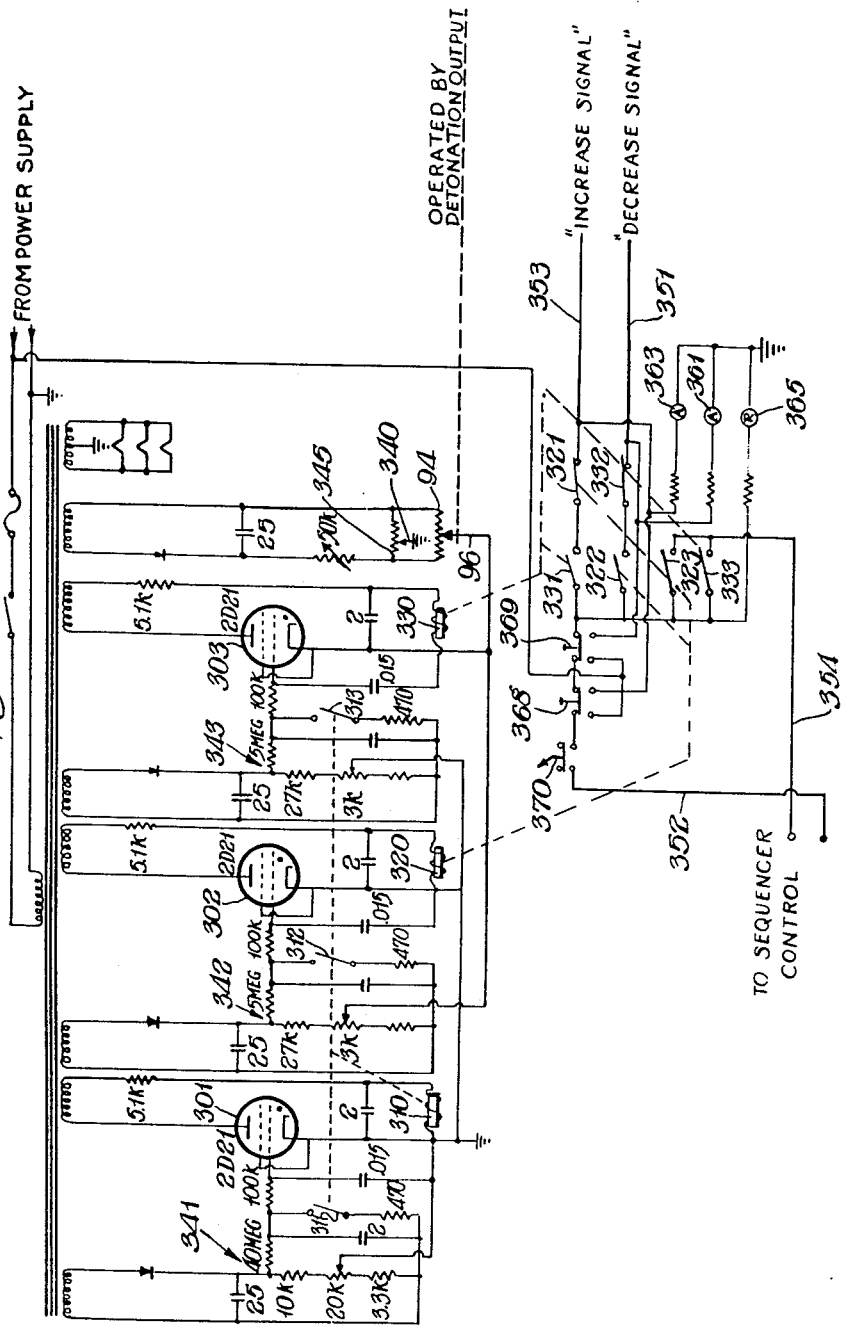

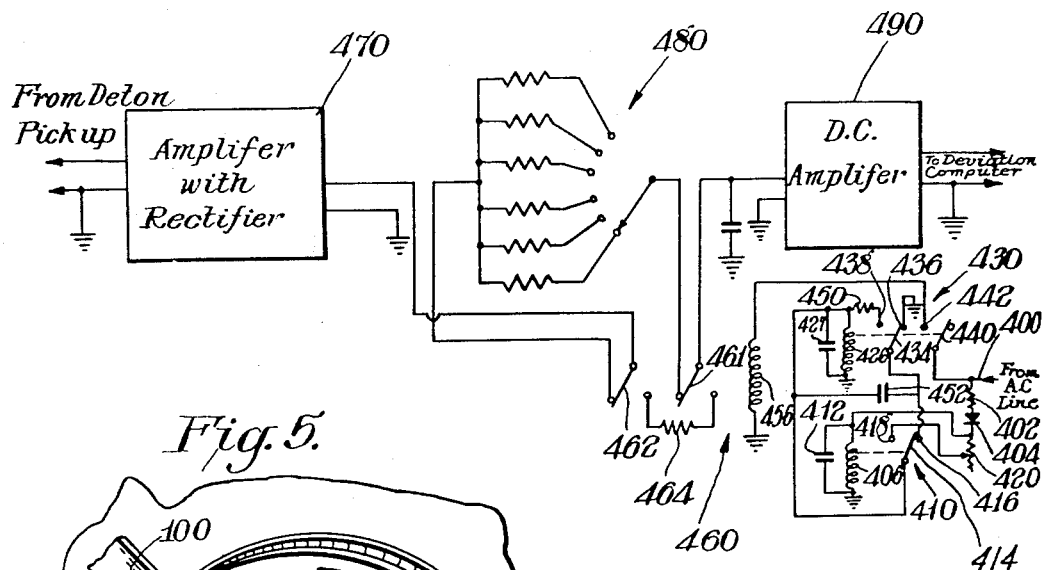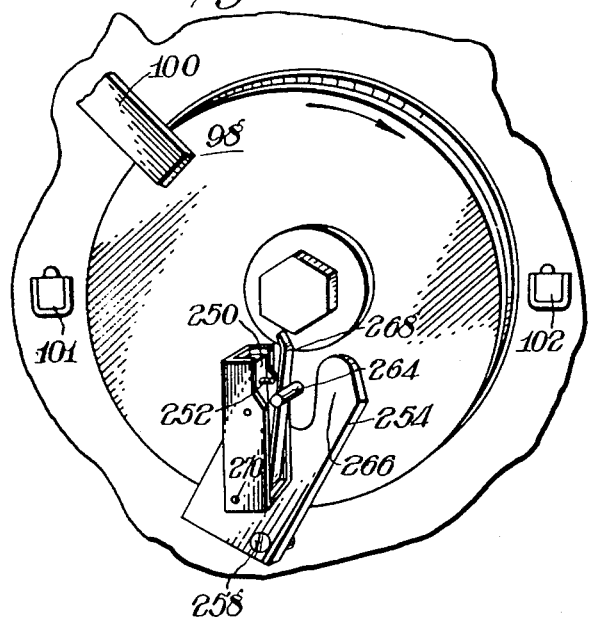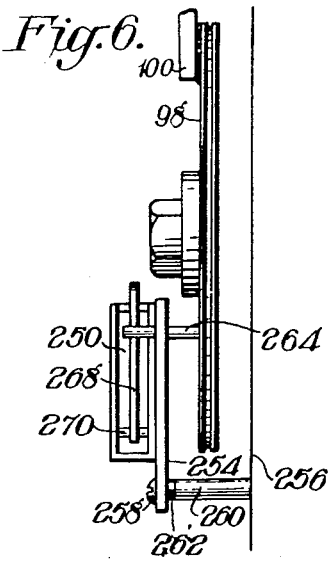

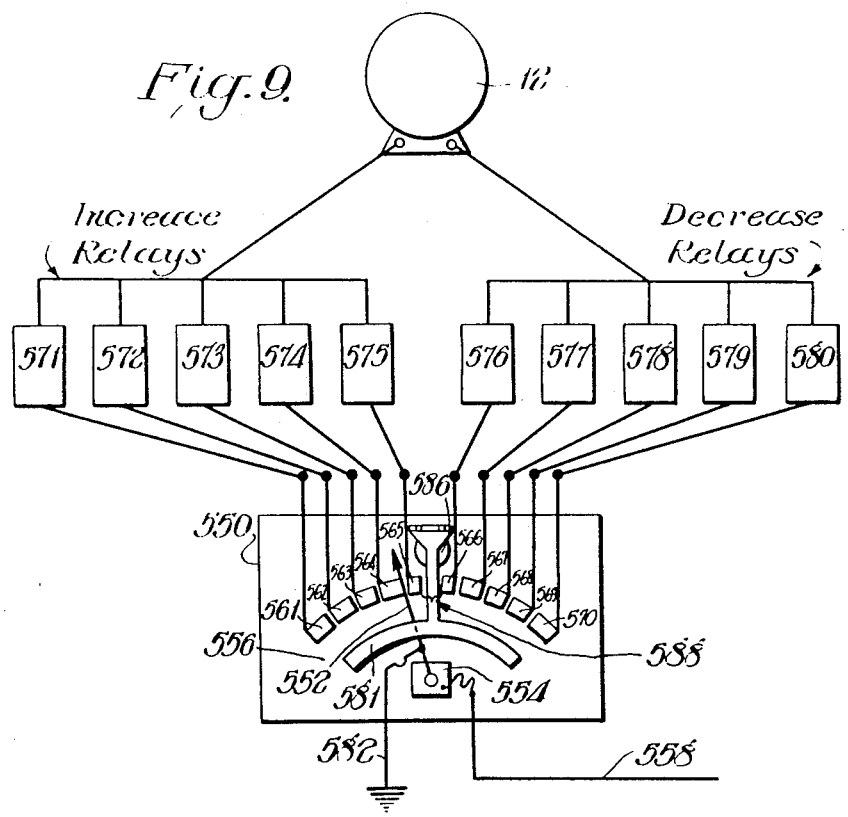
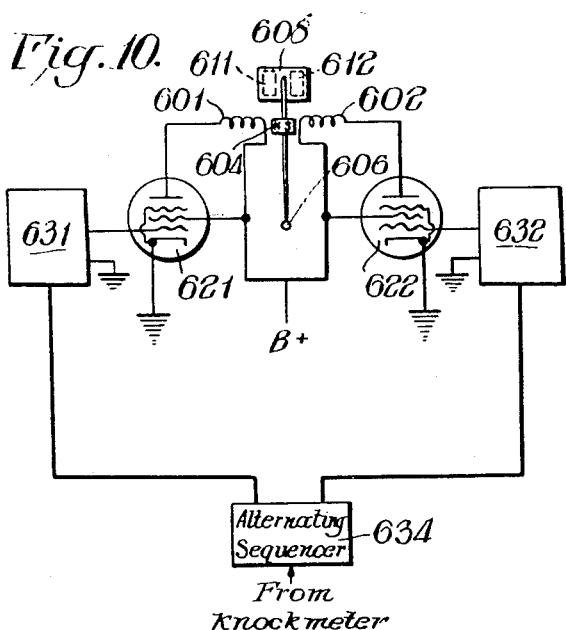
INVENTORS
John T. Jones,
William C. Ludt &
Hudson W. Kellogg

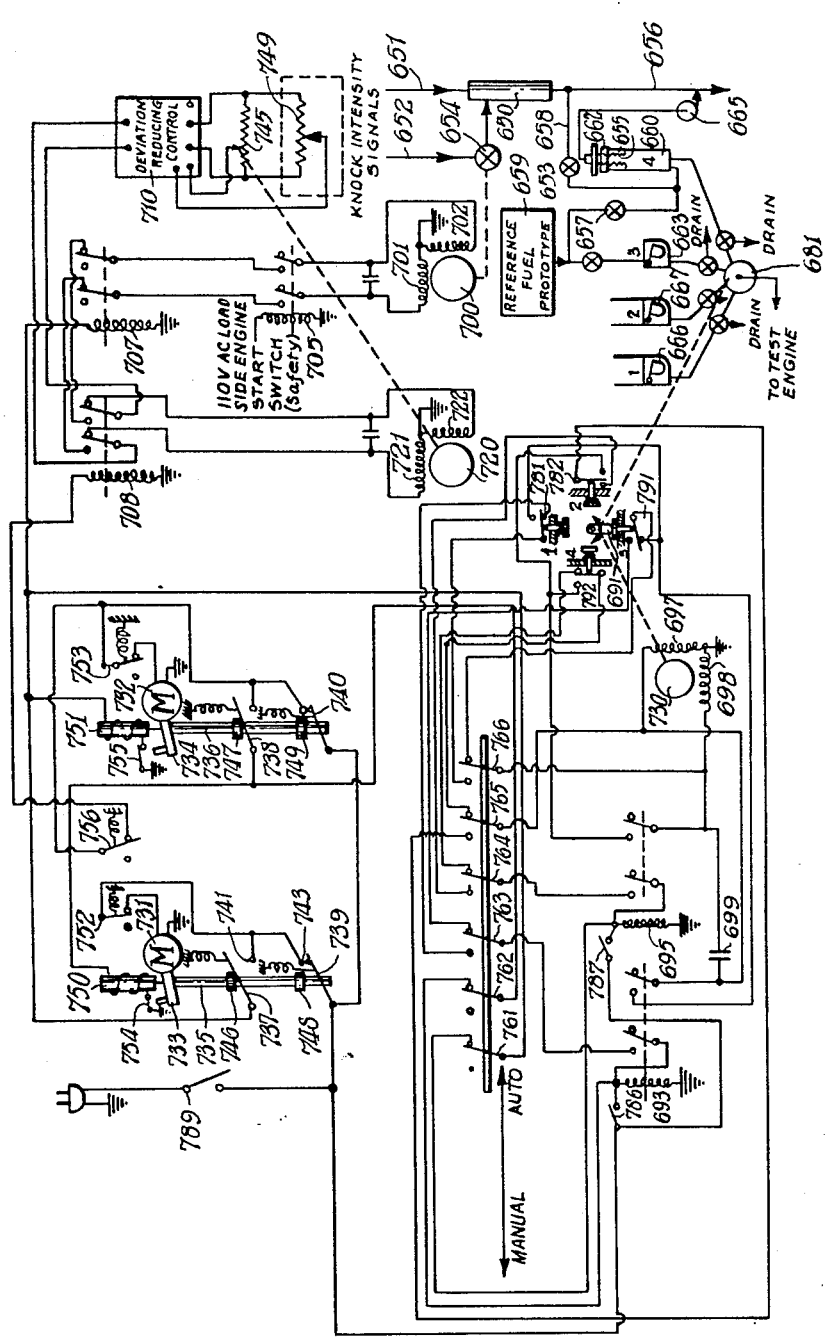

INVENTORS
John T. Jones,
William C. Ludt &
Hudson W. Kellogg

United States Patent Office 3,690,851
Patented Sept. 12, 1972

3,690,851
AUTOMATIC ANTIKNOCK RATING AND ADJUSTMENT APPARATUS
John T. Jones, Ardsley, William C. Ludt, Yonkers, and Hudson W. Kellogg, Dobbs Ferry, N.Y., assignors to Ethyl Corporation, New York, N.Y.
Continuation-in-part of application Ser. No. 617,754, Jan. 24, 1967, now Patent No. 3,485,598, which is a continuation-in-part of applications Ser. No. 205,015, June 25, 1962, now Patent No. 3,383,904, Ser. No. 299,583, Aug. 2, 1963, and Ser. No. 377,192, June 23, 1964. This application Dec. 19, 1969, Ser. No. 886,458
Int. Cl. C10k *3/00*
U.S. Cl. 44—2
22 Claims

ABSTRACT OF THE DISCLOSURE

Automatic antiknock monitoring and/or adjusting apparatus having detonation testing engine operated on fuel to be monitored or adjusted, and automatic controls to change its compression ratio in response to changes in detonation intensity, with occasional resetting against results using a reference fuel. Maximum knock fuel-air ratio is used and the automatic controls can also control the addition of high antiknock blend ingredient to the fuel.

---

The present application is a continuation of application Ser. No. 617,754 filed Jan. 24, 1967 (U.S. Pat. 3,485,-598, granted Dec. 23, 1969), which in turn is a continuation-in-part of applications Ser. No. 377,192 filed June 23, 1964; Ser. No. 299,583 filed Aug. 2, 1963 (now abandoned); and Ser. No. 205,015 filed June 25, 1962, now U.S. Pat. 3,383,904 granted May 21, 1968.

The present invention relates to the measurement and adjustment of antiknock ratings of fuels such as gasoline.

Among the objects of the present invention is the provision of novel apparatus for automatically adjusting the antiknock rating of the above type of fuels.

The foregoing as well as additional objects of the present invention will be recognized from the following description of several of its embodiments reference being made to the accompanying drawings wherein:

FIG. 1 is a schematic representation of an antiknock rating apparatus according to the present invention;

FIG. 2 is a generally diagrammatic view of the mechanical elements suitable for use in the apparatus of FIG. 1, showing a test engine and some of its related structures;

FIG. 3 is a partially schematic more detailed illustration of one form of an assembly of components that cooperate as in FIG. 1, to form an automatic rating apparatus representative of the present invention;

FIG. 4 is a circuit diagram of one form of deviation-reducing control for the apparatus of FIGS. 1 and 2;

FIG. 5 is an enlarged plan view of one of the controls of FIG. 3;

FIG. 6 is a side view of the control of FIG. 5;

FIG. 7 is a more detailed illustration of an auxiliary unit in the construction of FIG. 3;

Figure 12:
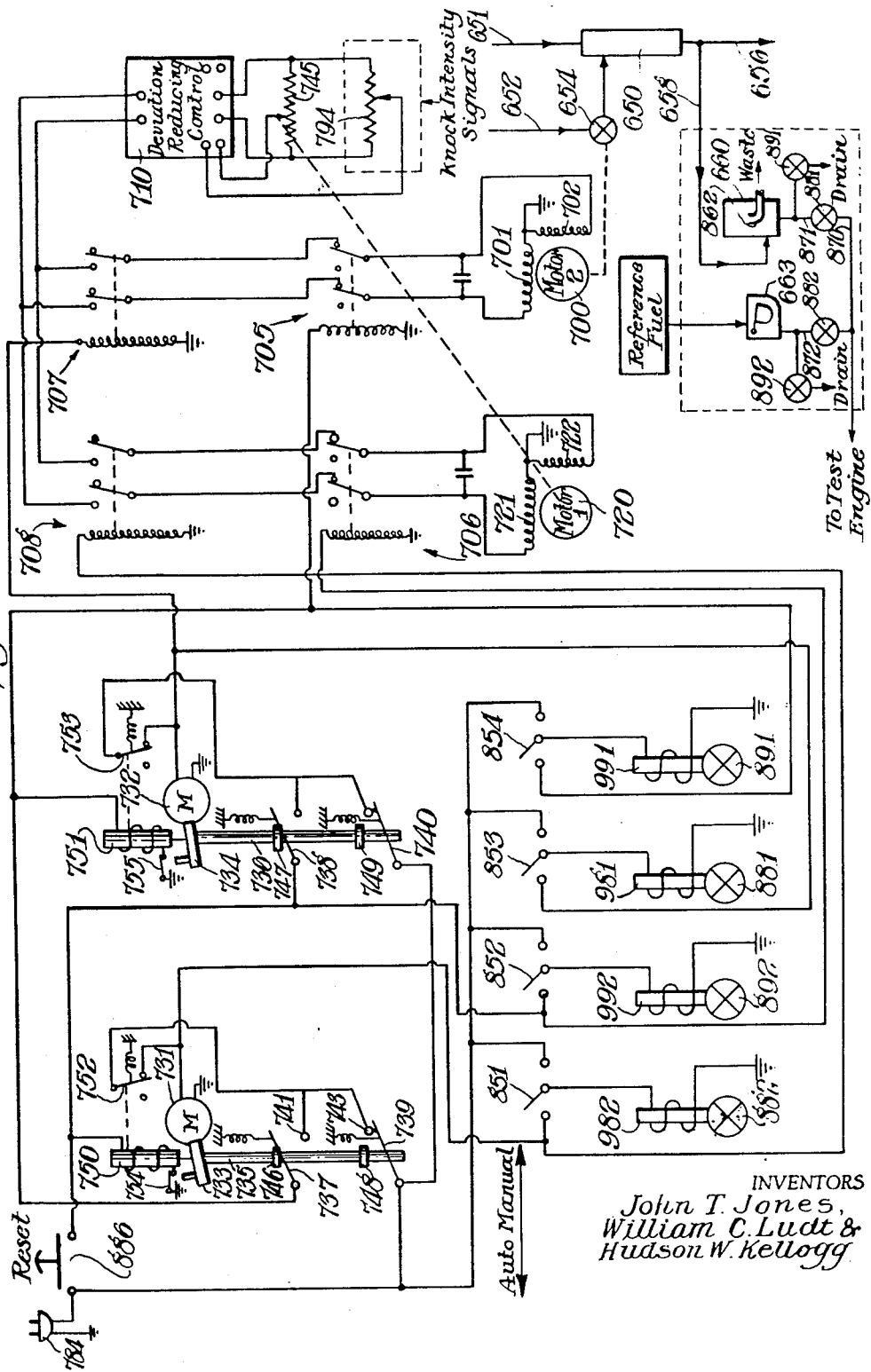

FIG. 8 schematically shows another form of assembly illustrative of the present invention.

FIG. 9 schematically shows another form of control unit suitable for use in accordance with the persent invention;

FIG. 10 is a schematic representation of a modified control unit in accordance with the present invention;

FIG. 11 is a detailed illustration of an adjusting assembly typical of the present invention; and FIG. 12 shows a modified adjusting assembly pursuant to the present invention.

According to the present invention an automatic apparatus is provided from monitoring and/or adjusting the knock rating of a fuel stream in a fuel supply system such as in a gasoline refinery. For example the invention can take the form of a blending apparatus for automatically producing a stream of blend fuel that has a substantially uniform antiknock rating, said apparatus including a detonation testing engine, a measuring system connected to indicate the intensity of detonation knocking that takes place in the engine and adjusting mechanism connected for automatically adjusting the compression ratio of the engine to keep the detonation intensity at a predetermined value, sampling means connected to receive samples of blend fuel and deliver them to the engine for combustion therein at maximum knock fuel-air ratio, the sampling means being further connected to deliver to the engine samples of a reference fuel for combustion therein at maximum knock fuel-air ratio, the adjusting mechanism being connected to cause the sampling means to automatically shift from one fuel to the other and back again, and automatic control structure connected to the measuring system to control the blending of the stream so as to have the compression ratio of the engine when operated on the blend fuel at a predetermined value based on the compression ratio when operated on the reference fuel.

For best results the apparatus is arranged to automatically switch the fuel supply to the test engine periodically so that the test engine will operate on a standard reference fuel sufficiently frequently that any departure in the operation of the engine can be promptly detected and compensated for. The sampling means can be connected to automatically shift the engine to the referenced fuel whenever the control action exceeds a predetermined limit. It is also preferred to have the control structure directly respond to changes in compression ratio rather than changes in detonation intensity.

A feature of the present invention is the inclusion in the monitoring or control apparatus of an automatic arrangement for adjusting the fuel-sampling means to the condition in which the fuel it delivers to the engine is at its maximum knock fuel-air ratio, and to then hold the sampling means in that condition.

Another feature of the present invention is that it can use a test engine and a detonation measuring system, both of which are standard octane rating items, so that the apparatus provides results that closely conform with standard specifications. Best results are also obtained when a temperature control such as cooling means is included in the apparatus to cool the fuel supplied to the engine or compensate for heating of the fuel caused by the apparatus or other sources.

The automatic arrangement for bringing the fuel-air ratio to maximum knock value desirably goes through an automatic sequence in which it first adjusts only the compression ratio of the engine to bring the detonation intensity to a predetermined value, then adjusts only the fuel-air ratio for the fuel on which the engine operates so that it is at the maximum knock ratio, and finally continues to operate by adjusting only the compression ratio.

The maximum knock-adjusting sequence can be arranged to take place once in a measurement and/or control operation, after which the compression ratio can be automatically adjusted without further fuel-air ratio changes. In addition the sequence is particularly effective if the fuel-air ratio adjustment is carried out by first reducing that ratio to a very low value and then increasing the ratio in small increments until the knock intensity just goes through a maximum.

Referring to the drawings, the apparatus of FIG. 1 includes a test engine indicated at 10 which can be of the standard type such as illustrated and described in the 1960 ASTM Manual for Rating Fuels by Motor and Research Methods, published by the American Society for Testing and Materials, Philadelphia, Pa. Such a conventional engine can be and is frequently equipped with an actuator 12 for changing its compression ratio, which actuator is in the form of a reversible electric motor. The apparatus of FIG. 1 is further provided with a second actuator 14 for changing the fuel-to-air ratio of the combustion mixture applied to the test engine. Actuator 14 can also be electrically operated as by means of a reversible electric motor.

As in the usual test engine construction, a detonation pick-up 16 is provided so as to develop an electrical signal varying in intensity in accordance with the intensity of the detonation or knock that occurs during the operation of the test engine. In the apparatus of FIG. 1 the signals so produced are delivered to an amplifier and deviation computer 18 which amplifies the signals and also determines how far the detonation or knock varies from some predetermined value. If desired the amplified signal can be displayed on a meter such as the usual knockmeter 20. In addition a recorder 22 may be used to make a record of the signals, either indicative of the degree of knock or of the deviation from the predetermined knock intensity, or both. Recorders of this type are well-known and will make records on circular or rectangular charts, usually with a moving pen actuated by the electric signal being recorded as well as by a timing mechanism that moves the chart.

The automatic testing of the present invention is effected by a combination of a deviation-reducing control 24, a knock-maximizing control 26 and a sequencer 28. The deviation-reducing control 24 is supplied with signals from the deviation computer 18 and is connected to compression ratio change actuator 12 so as to change the compression ratio in the direction which reduces the difference between a pre-set knock intensity and the knock intensity indicated by the detonation pick-up. The knock-maximizing control 26 is supplied with signals from the amplifier 18 or the detonation pick-up 16, and in turn is connected to the fuel-air ratio change actuator 14. Sequencer 28 is connected to operate the two controls 24 and 26 in the appropriate sequence. At the completion of the testing sequence the antiknock rating can be read from an indicator 30 which is conveniently operated by the compression ratio change actuator 12. When operating at the fuel-air ratio for maximum knock intensity, each fuel has one specific compression ratio at which it will produce a standard knock intensity and this compression ratio determines the antiknock rating of that fuel. For ratings up to and including 100, the rating signifies the percentage of iso-octane (2,2,4-trimethylpentane) in a mixture of the iso-octane with normal heptane, which mixture develops the same standard knock intensity under maximum knock conditions at that compression ratio. For fuels having antiknock ratings above 100, the rating similarly represents the compression ratio at which the standard knock intensity is developed under maximum knock conditions by mixtures of iso-octane with tetraethyl lead rather than mixtures of iso-octane with normal heptane.

Indicator 30 can show both the antiknock rating and the corresponding compression ratio, or it can show merely one or the other of these values. Antiknock ratings have a standard relationship to the final compression ratios, as indicated for example in Table V on p. 21 of the above manual.

For convenience in making preliminary or intervening adjustments of compression ratio, the construction of FIG. 1 can include a manual control 32 such as a simple three-position switch for energizing actuator 12 in one direction or the other, or for setting the actuator so that it is controlled only by the deviation-reducing control 24. A similar manual control 33 can be used for fuel-air ratio changes.

FIG. 2 illustrates the interrelationship between the test engine 10, actuating motor 12 for changing the compression ratio of the engine, and actuating motor 14 for changing the fuel-air ratio. Engine 10 is of the conventional construction with its cylinder 34 movable to and fro along its cylindrical axis. Near the base of the cylinder it is provided with external thread 36 that meshes with internal thread on a rotary nut 38 which is in turn accurately supported so that it does not show any movement in the direction of the cylindrical axis. However, the nut 38 can rotate around that axis and is rotatably driven to and fro in that direction by a worm 40 that meshes with external threads 42 on the nut 38. Worm 40 is in turn driven by the motor 12 as by means of drive coupling 44 and speed reducing gear box 46. Indicator 30 can also be connected to be driven by worm 40 as by means of the flexible drive shaft 48.

The intake line 50 for engine 10 has the usual venturi 52 with a fuel discharge tube 54 leading to and opening in the venturi throat. A fixed fuel level sight glass 56 is shown as in communication with the fuel discharge tube 54 for convenience in reading the height of the fuel level, although such reading is not needed for automatic operation in accordance with the present invention. Flexible conduit 58 connects the fuel discharge tube 54 with a carburetor bowl 60 having a valve-controlling float 62 that determines the level of the fuel in which the float is immersed. The carburetor bowl 60 is provided with an arm 64 containing a vertical passageway that is internally threaded and threadedly engaged on a vertically disposed externally threaded shaft 66 journaled at its ends in a frame 68. One end of the threaded shaft 66 is connected for rotation by motor 14, and the shaft itself is so supported that it cannot move vertically. Frame 68 is also arranged to guide arm 64 so that the arm carries the carburetor bowl upwardly or downwardly, depending upon which way motor 14 rotates, without permitting the arm to tilt or swing. The higher the float controlled fuel level with respect to the venturi 52, the richer the fuel-air ratio of the mixture delivered to intake line 50.

The usual detonation pick-up 70 is mounted in the head or top of the test engine 10 so that the pick-up has its sensing element exposed to the combustion chamber 72 of the engine. The sensing element can be a simple piezo-electric transducer that generates an electrical signal when subjected to pressure or rate of pressure change, and modulates the signal so that it follows the change in pressure or in rate of pressure change. Knocking or detonation during engine operation causes development of pressures higher than for normal combustion and rates of pressure change in excess of those for normal combustion, and the electrical signal corresponding to these high pressures or high rates of pressure change can be readily distinguished. An amplifier 74 similar to that ordinarily used, can be arranged to amplify the electrical signals and make them suitable for reading by knock-meter 20. Amplifier 74 corresponds to the amplifier noted in FIG. 1 as an integral portion of unit 18.

Figure 3:
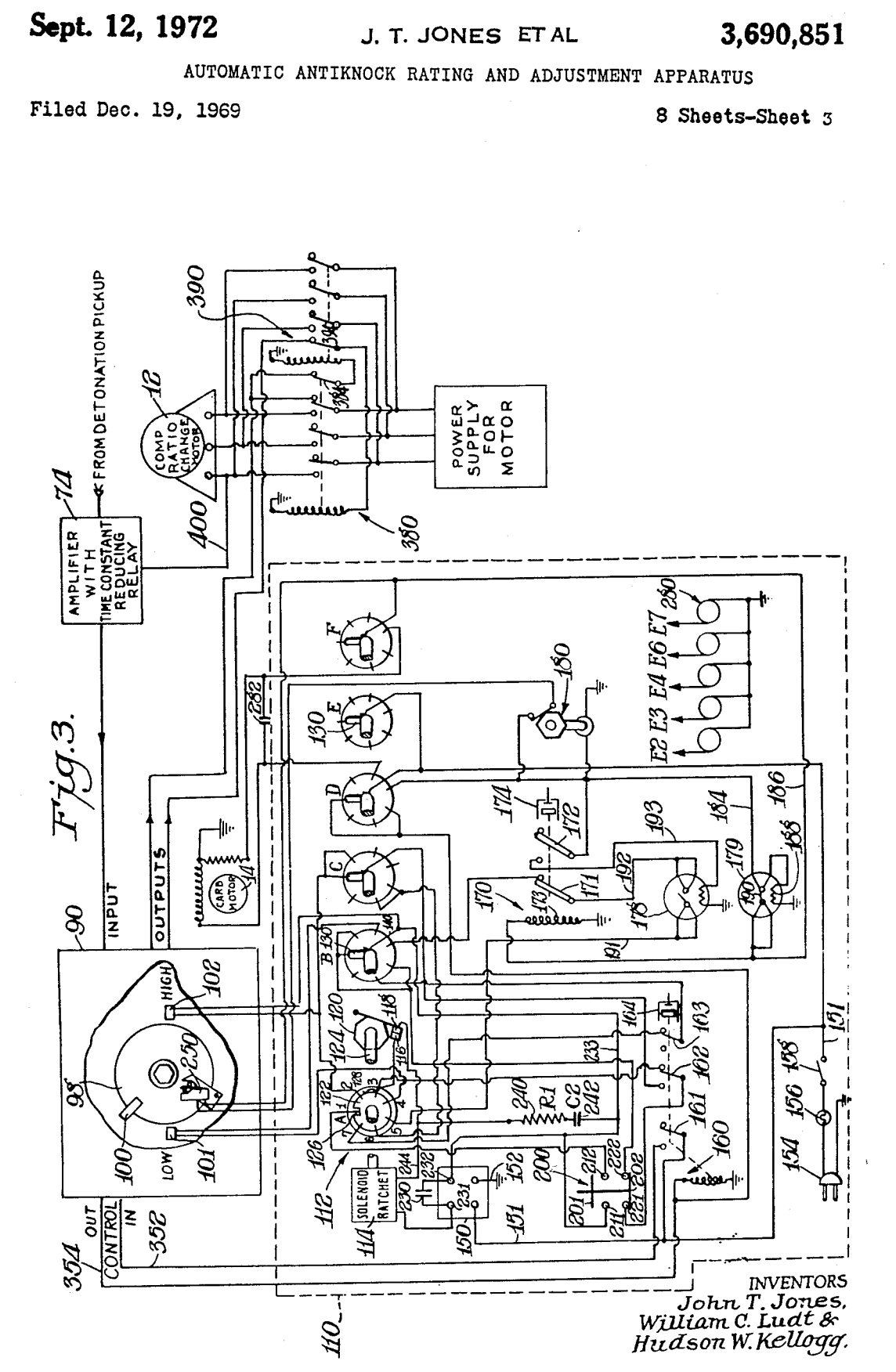

FIG. 3 illustrates an automatic octane rating apparatus of the invention in which a deviation computer and portions of a knock maximizing control are combined in a single unit 90 which can also include the deviation reducing control shown in FIG. 4. Unit 90 is built around a recorder such as the ElectroniK 17 strip chart model available from Minneapolis-Honeywell Regulator Company and described in its instruction manual numbered 367001. The recorder has the usual chart that is fed from a supply roll to a take-up roll at a constant speed, and a pen that is traversed across the chart in accordance with variations in electrical signals delivered to an input terminal. These features are well known and since they are not essential parts of the present combination, are not illustrated. The recorder is also equipped with a control slide wire represented at 94 in FIG. 4, that has its wiper or tap 96 moved in accordance with movements of the pen so as to set up a control point having a potential intermediate between that across the ends of this slide wire.

Movement of the pen and tap 96 is effected with the help of pulley 98, and for the purposes of the present invention this pulley is provided with an actuator bar 100 that turns with it and is located so as to close either of a pair of switches 101, 102 when the pulley rotates sufficiently far in either direction. Switch 101 is shown as a low limit switch, and switch 102 as a high limit switch.

Unit 90 is under the control of a sequencer 110 that includes a ganged set of stepping switches 112 driven by a solenoid ratchet stepper 114. Six wafer-type switch segments, identified as A, B, C, D, E and F, are in this ganged set along with a set of breaker contacts 116, 118 operated by cam 120. Wafer 112A has a central electrically conductive contact disc 122 rotated by shaft 124 common to all the switch segments, and it has a notch 126 at one portion of its periphery. A wiper or brush contact 128 is fixed and remains in electrical connection with the disc throughout its rotation so as to provide a fixed terminal for electrical connection to that disc. Around the periphery of wafer 112A are seven fixed terminals numbered 1, 2, 3, 4, 5, 6 and 7, each projecting centrally so that they come into wiping engagement with the disc as it rotates. Each terminal is, however, so dimensioned that when notch 126 is brought into opposition to it, the wiping end of the terminal will lie completely within the notch 126 so that terminal becomes disconnected from the disc.

Segments B, C, D, E and F can also be of the wafer type with seven similarly located terminals each, but in each of these a narrow arm 130 is arranged to individually contact one of the terminals at a time as shaft 124 rotates. Arms 130 of each of the segments B, C, D, E and F are electrically insulated from each other as well as from disc 122, and each has its own fixed wiping contact 140.

Solenoid ratchet 114 is connected for energization by a DC source of current such as rectifier 150 which is shown connected through hot lead 151 and grounded lead 152 to a plug 154 that can be inserted in a conventional 110 volt AC power line receptacle. Fuse 156 and on-off switch 158 can also be included in this circuit.

The sequencer also includes a delay relay generally indicated at 160 for the deviation reducing control and another delay relay 170 for the knock maximizing control. Relay 170 operates in conjunction with an interrupter 180 as well as with delay switches 178 and 179.

Delay relay 160 has three switch armatures 161, 162 and 163 illustrated in the normal position which they take when this relay is not energized. In these positions the armatures engage back contacts. When relay 160 is energized it immediately pulls its armatures over so that they each engage front contacts and this operation is completed without any delay. However, when the relay is de-energized the armatures will be held against their front contacts for a period of about one minute before the armatures are released from their front contacts and permitted to fall back to their back contacts. A dash pot 164 is illustrated as providing the above delay, but any other form of delay mechanism can be used if desired.

Relay 170 is operated in the same manner, a delay dash pot being here represented at 174. A pair of armatures 171, 172 forming part of relay 170 are shown in the normal position they take when this relay is not energized. Winding 173 of relay 170 is energized from either of a pair of parallel leads 184, 186, and in series in lead 184 is the delay switch 179 which is of the normally closed type that stays closed until about twenty seconds or so after power is supplied to lead 184. This type of operation is supplied by means of a heater 188 which forms part of switch 179, in combination with a switch arm 190 of bimetallic nature located so as to be warmed by the heater 188 to the degree required to snap open after the heat has been on for the above period of time.

Switch 178 is of the normally open type, the switch terminals being connected to leads 191, 192, and the heater being separately connected to lead 193.

The sequencer of FIG. 3 also has a reset or start switch 200 with two armatures 201, 202 mechanically biased to the illustrated position as by a spring, not shown. In this position armature 201 is out of engagement with a pair of contacts 211, 212, but armature 202 is in engagement with its two contacts 221, 222.

It is also desirable to connect a capacitor 230 across the DC output terminals 231, 232 of rectifier 150, and to connect a resistor 240 and capacitor 242 in series between terminal 232 and solenoid lead 244 with which terminal 232 is intermittently connected by the switching arrangement.

Pulley 98 of unit 90 has, in addition to the low and high limit switches 101, 102, mechanical maximum sensing elements that include a maximum switch 250 with an actuating nose 252 biased outwardly and holding this switch in open position. Maximum switch 250 (FIG. 5) is fixed on a plate 254 which in turn is pivotally secured to a stationary support 256. Mounting screw 258 passes through an aperture in plate 254 and through a bushing 260, and is threadedly engaged in support 256. This mounting screw arrangement permits plate 254 to pivot and also frictionally engages the plate sufficiently to keep it from pivoting unless it is rotated by a force of sufficient magnitude. A flat or arched spring friction washer 262 can be inserted between bushing 260 and plate 254 or between the head of the mounting screw 258 and plate 254, to improve the frictional engagement.

Pivoting of the plate is effected by a pin 264 secured to the face of the pulley 98 and arranged to engage the switch 250 as the pulley 98 rotates. A cam lobe 266 in plate 254 cooperates with pin 264 to pull the plate in clockwise direction around its mounting screw as seen in FIG. 5, when the pulley 98 rotates an appreciable distance in counterclockwise direction around its pivot. This clockwise pivoting of plate 254 helps bring switch 250 closer to the pin so that the pin will not have as far to travel when it returns from a counterclockwise excursion. Because the tilting of plate 254 can position switch nose 252 at varying distances from the center of pulley 98, an auxiliary contactor 268 can be used to cover nose 252 and provide engagement for pin 264 regardless of the tilt of plate 254. Auxiliary contactor 268 can be journaled on a pivoted bar 270.

Indicator lights 280 can also be used to show the condition of the apparatus, and a capacitor 282 can be connected between the ungrounded ends of the drive windings for motor 14.

The various leads in the sequencer of FIG. 3 are connected as follows:

Terminal 1 of switch segment A to terminal 212.
Terminal 2 of switch segment A to terminals 1 and 2 of switch segment C and to first end of high switch 102.
Terminal 3 of switch segment A to back contact for armature 162.
Terminal 4 of switch segment A to first end of low switch 101.
Terminal 5 of switch segment A to lead 191.
Terminal 6 of switch segment A to terminals 5 and 6 of switch segment C.
Terminal 7 of switch segment A to back contact for armature 163.
Center contact of switch segment A to lead 244 (through breaker points 116, 118).
Terminals 1, 2 and 5 of switch segment B to terminal 222.
Terminal 3 of switch segment B to second end of low switch 101.
Terminal 4 of switch segment B to back contact for armature 171.
Terminal 6 of switch segment B to armature 163.
Center contact of switch segment B to terminal 211 and second end of high switch 102.
Center contact of switch segment C to front contact for armature 162.

Terminals 1 and 5 of switch segment D to winding of relay 160.

Terminal 3 of switch segment D to carburetor motor (lowering connection).

Terminal 4 of switch segment D to lead 184, armature 172, one terminal of motor of interrupter 180, and one of the interrupter terminals of interrupter 180.

Center contacts of switch segments D and E to power supply lead 151.

Terminals 2, 3, 4, 6 and 7 of switch segment E to indicator lights 280.

Terminal 4 of switch segment F to carburetor motor (rising connection).

Center contact of switch segment F to lead 186 and first end of maximum switch 250.

Second terminal of interrupter 180 to second end of maximum switch 250.

Lead 193 to front contact for armature 172.

Armature 162 to terminal 221.

FIG. 4 illustrates a highly effective form of deviation reducing control similar to that available commercially as Model HP–102 Deviation Proportional Pulse Control Relay of the Minneapolis-Honeywell Regulator Co. As in this commercial model, the control of FIG. 4 has three thyratron tubes 301, 302, and 303 connected with discharge circuits and discharge tripping circuits. Relays 310, 320 and 330 have their windings in sereis in the respective discharge circuits. Relay 310 has three armatures 311, 312, 313 and simultaneously moves all three to switch-closing position when it is energized by a discharge in thyratron 301. Such discharge is triggered by an adjustable grid circuit 341 and the closing of the grid return circuit through armature 311 shorts out the grid triggering voltage so that the discharge soon terminates. Meanwhile similar grid triggering circuits 342 and 343 charge up the grids of thyratrons 302 and 303 to their firing voltage, and if the voltage of tap 96 is different from that of tap 340 in a set point slide wire 345, one of these two thyratrons will have its grid voltage raised sufficiently to fire while the other will be lowered a little and will not fire.

Relay 320 is in the discharge circuit of the thyratron that fires when the voltage of the control slide wire tap is too high, and this relay actuates armatures 321, 322 and 323 from their normal positions, which are illustrated, to their actuated positions in which they close a circuit supplying a pulse of power to "decrease" lead 351 from a power supply lead 352. At the same time a similar "increase" signal lead has its open connection further opened to help assure that both "increase" and "decrease" signals are not delivered simultaneously.

Conversely, when the relay 330 is energized, it actuates armatures 331, 332 and 333, delivering a pulse of "increase" signal.

When the potentials of taps 96 and 340 are sufficiently close together, neither the thyratrons 302, 303 fire, and no signal is delivered to line 351 or line 353. In any case, the shunting action of armatures 312, 313 under the actuation of relay 310 resets the firing circuits of thyratrons 302, 303 and prepares them for the next firing trigger.

A feature of the above deviation reducing control is that the correction pulses delivered to line 351 or 353 are longer when the taps 96 and 340 are further apart in potential. As a result the corrections will much more rapidly bring the knock intensity to the standard value as determined by set point tap 340 and will do this with less hunting.

Typical circuit constants for the circuit of FIG. 4 are given in the drawing (capacitances in microfarads and resistances in ohms) and provide very effective results when used with thyratron plate supplies at 270 AC volts and with grid potential supplies at 29 DC volts measured at their recifier output capacitors. The potentiometer in the grid circuit of thyratron 301 is preferably adjusted to produce a pulse repetition rate of about one per ten seconds, and the potentiometers in the grid circuits of the other thyratrons adjusted so that thyratrons 302 and 303 just barely miss firing when the control slide wire tap has the same potential as the set point slide wire tap and the thyratron 301 fires. To help follow the operation of the circuit, indicator light 361, 363 are connected in parallel with output leads 351, 353 and one of these will light whenever a correcting pulse is being delivered. Another light 365 is connected to light when power is supplied to lead 352 and is available to pulsing armatures 321, 322, 331 and 332.

Manual control switches 368, 369 of the momentary contact type are also shown as provided to enable manual pulsing of increase and decrease signals. An automatic disabling switch 370, preferably of the on-off type that remains in the position to which it is moved, can also be inserted in lead 352.

The apparatus of FIG. 4 is interconnected in the combination of FIG. 3 by having the power supply lead 352 of FIG. 3 switched on and off through armature 161 of relay 160 in FIG. 3. In addition another interconnection 354 is used to energize relay 160 whenever a correcting pulse of either kind is delivered by the circuit of FIG. 4.

The assembly of FIG. 3 is placed in operation after connection to the appropriate power supplies, by operating reset switch 200 to bring the sequencer into position 1 (illustrated), after which this switch is released. When the sequencer is in any other position the action of the reset switch in closing a circuit between contacts 211, 212, completes an actuating circuit from rectifier output terminals 231, 232 to the solenoid 114 through disc 122 of switch segment A and its terminal 1. The solenoid will accordingly rotate the selector one step clockwise as seen in FIG. 3. During this step breaker cam 120 opens breaker points 116, 118 until the step is completed. Holding reset switch 200 down will thus assure the stepping until selector reaches position 1 at which time the notch 126 opens the circuit to terminal 1 of segment A and the actuation is terminated.

At the same time segment D of the sequencer as it reaches position 1 completes a connection from power lead 151 through terminal 1 of the segment to the winding of relay 160. This actuates relay 160 which through its armature 161 starts the correction action of the derivation reducing control of FIG. 4. In the meantime the reset switch 200 is released and this completes a supplementary energizing circuit for the solenoid 114 from disc 122 through terminal 2 of segment A, terminal 1 of segment C, center contact of segment C, actuated armature 162, terminals 221, 222 of the reset switch, terminal 1 of segment B, center contact of segment B, lead 233 and terminal 232. This steps the sequencer to position 2 where the bulk of the correction action of the circuit of FIG. 4 is completed. At this position the notch 126 opens the above supplemental energizing circuit to terminal 2 of segment A so that the sequencer remains in position 2.

During the dwell in position 2 the compression ratio of the engine is brought by the deviation reducer of FIG. 4 to the value that produces a detonation signal corresponding to the predetermined standard as set by set-point tap 340. When the correspondence is sufficiently close, the deviation reducer will not develop a correcting pulse in output lead 351 or 353 and as soon as the time delay of relay 160 runs out, the armatures of that relay return to their deenergized position (the one in which they are shown) and this closes a solenoid actuating circuit from disc 122, terminal 3 of switch segment A, armature 162, terminals 221, 222 of reset switch 200, terminal 2 of switch segment B, center contact of switch segment B, and terminal 232. The solenoid accordingly steps to position 3, where the notch 126 again opens the solenoid circuit.

In position 3 the relay 160 remains deenergized but the switch segment D completes a circuit that energizes the carburetor motor 14 and causes it to lower the carburetor. This lowering leans out the fuel mixture and as a result reduces the knock intensity. As the intensity becomes lower, pulley 98 rotates in counterclockwise direction as seen in FIG. 3, and it will soon bring its arm 100 around far enough to close low switch 101. When this happens another solenoid energizing circuit is established from disc 122 through terminal 4 of switch segment A, low switch 101, terminal 3 of switch segment B, center contact of segment B, and terminal 232. This steps the solenoid to position 4 where notch 126 again stops it.

In position 4 the downward rotation of carburetor motor 14 is stopped, and instead switch segments D and F establish an upward rotating energizing circuit for that motor through lead 151, center contact of segment D, terminal 4 of segment D, lead 184, normally closed delay switch 179, lead 186, center contact of segment F and terminal 4 of segment F. The carburetor motor accordingly now raises the carburetor for a few seconds until delay switch 179 opens circuits. This period is preferably about twenty seconds.

As the carburetor is thus raised, the detonation intensity increases and pulley 98 is rotated clockwise bringing its pin 264 against the nose 252 of switch 250, closing this switch. The closing of switch 250 establishes a carburetor raising circuit as a shunt across delay switch 179. This shunt branches off from lead 184 through the contacts of interrupter 180 and the now closed maximum switch 250, and branches back to the center contact of segment F. Accordingly when delay switch 179 times out, the carburetor continues to rise but now does so in an interrupted manner, as for example moving up in 2 to 5 second steps spaced by 5 to 10 second intervals of no movement. This intermittent upward travel of the carburetor is continued as long as it causes the knock intensity to increase and the pulley 98 to move in clockwise direction. When the maximum knock intensity is reached the pulley no longer rotates, and at the next raising of the carburetor the knock intensity diminishes and the pulley 98 makes a very small return step in counterclockwise direction. This withdraws pin 264 from the maximum switch and promptly permits that switch to return to its normally open position, thus stopping further carburetor movement.

In the meantime delay relay 170 was energized through delay switch 179 when the sequencer first reached position 4, and after delay switch 179 open-circuited, this relay continued to be energized through lead 186 each time the carburetor was driven upwards. Until maximum switch 250 opens, the armatures 171, 172 of the delay relay 170 are accordingly held in actuated position. In this position they prepare a step triggering energizing circuit for the solenoid 114, from terminal 4 of switch segment D to terminal 5 of switch segment A. This energizing circuit is kept open initially by normally open delay switch 178, and after that closes as a result of the heating action through actuated armature 172, actuated armature 171 keeps the circuit open. However, when the maximum switch 250 is opened, the relay 170 is no longer energized and it times out, closing the solenoid energizing circuit. The selector thereupon steps to position 5.

In position 5 switch segment D closes a circuit that actuates relay 160 and also supplies energy for the deviation reducer to operate and adjust the compression ratio of the engine. The actuation of armature 161 completes the energizing circuit for the deviation reducer, and at the same time actuation of armature 162 closes a stepping circuit for solenoid 114. This stepping circuit runs from disc 122 through terminal 6 of switch segment A, Terminal 5 of switch segment C, the center contact for switch segment C, armature 162, terminals 221, 222, terminal 5 of switch segment B, the center contact of switch segment B, and terminal 232. The sequencer accordingly promptly steps to position 6, but this does not interfere with the continued operation of the deviation reducer. When relay 160 times out at the end of the new compression ratio search, its arms 163 completes a solenoid stepping circuit that advances the sequencer to position 7. This stepping circuit runs from disc 122 through terminal 7 of switch segment A, armature 163, terminal 6 of switch segment B, the center contact for switch segment B, and terminal 232. In position 7 the measuring cycle is over and the apparatus does not function. It is ready, however, for another measuring cycle which can be initiated by merely operating reset switch 200 for a moment.

The compression ratio developed in step 6 need not be and generally is not the same as the compression ratio reached while the sequencer is in position 2, inasmuch as in position 6 the fuel-air ratio has been brought to maximum knock condition whereas at position 2 no maximum knock fuel-air ratio need have been present. The net result is that in position 6 the compression ratio will be automatically brought to the same value which would be arrived at through the standard ASTM process for manually measuring antiknock ratings. In fact the automatic process of the present invention can even be considered more accurate in that it eliminates errors that may be inherent in the interpolation which is part of the ASTM procedure. The maximum knock fuel-air ratio is generally the same when a fuel knocks at standard knock intensity, as when the fuel knocks at other intensities within a significant range above and below standard intensity. It is accordingly unnecessary to go through any more fuel-air adjustment steps after the first.

In some cases, however, the apparatus may be set for one fuel, and then used to test a fuel so greatly different that during the fuel-air adjustment, the operating limits of the apparatus might be exceeded. According to the present invention this is prevented by an automatic recycling arrangement. Thus, if during the lowering of the carburetor the knock intensity increases unduly, indicative of an excessively high initial carburetor position, arm 100 on pulley 98 will be brought into engagement with switch 102 causing that switch to close. This completes a recycle circuit from disc 122 through terminal 2 of switch segment A, high limit switch 102, center contact of switch segment B and terminal 232. This causes the solenoid 114 to ratchet the sequencer around until notch 126 reaches terminal 2, and in passing through position 1, just before this, relay 160 is energized through switch segment D to start another compression ratio search. This new search will end with the fuel-air ratio at a value more suitable for continued automatic adjustment.

Similar recycling also takes place if the knock intensity reaches the same high value during the carburetor raising at sequencer position 4, if this takes place before the maximum knock search is completed. In such a situation the high limit switch 102 is again closed and the same recycling circuit is completed to return the sequencer to position 2 and another compression ratio search.

The same safety recycling will take place whenever the knock intensity becomes excessive, so long as the sequencer is in any position but position 2. Thus should the sequencer even be in the read-out position (position 7) when a very low octane fuel is added to the carburetor, possible damage from excessive knock will be avoided. It is accordingly not necessary to reset the apparatus when the fuels are changed. No automatic recycling is necessary for position 2 inasmuch as in this position the equipment automatically lowers the compression ratio when the knock intensity is too high, and such lowering takes place quite rapidly when the knock intensity is very high.

In the combination of FIG. 3 the compression ratio change motor 12 is operated from the output leads of the deviation reducer by means of relays 380, 390. The motor itself is shown as operated by a three-phase power supply and each relay has three armatures conventionally arranged to interchange the connections to two leads of the three-phase power supply and thereby provide reversible motor actuation. A set of additional armatures 384, 394 included in each relay is series-connected in the energizing circuit for the other relay to thereby reduce the possibility that both relays may inadvertently be operated at the same time. This result is obtained because energizing one relay opens the circuit through which the other must be energized.

Another feature of the present invention is the automatic adjustment of time constant that simplifies and speeds up the use of the apparatus. This is shown more fully in FIG. 7 where a lead 400 from the AC power circuit to compression ratio change motor 12 controls the time constant. This lead is connected through resistor 402 and rectifier 404 to the windings 406 of a relay 410 and then to the ground return. The windings are bridged by a small capacitance 412 to reduce chatter. Relay 410 has an armature 414 connected to the ground return through the windings 426 of a second relay 430. A back contact 416 for armature 414 is connected to armature 434 of relay 430. A front contact 418 for armature 414 is connected through an adjustable resistor 420 in the output of rectifier 404. A back contact 436 for armature 434 is grounded to the power return and a front contact 438 for this armature is connected through a small resistor 450 to the ungrounded end of windings 426. A second armature 440 of relay 430 is connected to the power lead 400 and has a front contact 442 which returns to ground through windings 456 of a third relay 460. A timing capacitor 452 bridged between contact 416 and its armature 414 arranges for the desired energization of relay 460.

When compression ratio change motor 12 is operated, power is supplied through lead 400 and actuates relay 410. This pulls armature 414 away from short-circuiting condition with respect to the timing capacitor 452 and permits the timing capacitor to charge up through resistor 420, front contact 418, armature 414, capacitor 452, armature 434 and back contact 436. After about a second or two of charging, the voltage will build up to the point where windings 426 are energized to trip relay 430 and cause its armature 440 to energize the third relay 460. Armature 434 will rapidly discharge capacitor 452. The three relays will then remain in those respective conditions until the power supply to lead 400 is interrupted, when all three relays 410, 430 and 460 will be deenergized.

Relay 460 adjusts the time constant for the knock measurement response by means of two armatures 461, 462 and a resistor 464. In the deenergized condition of relay 460, as illustrated, armatures 461, 462 merely complete the circuits from an amplifier and rectifier combination 470 through a selectable time constant adjusting resistor switching assembly 480 and through a further DC amplifier 490 so that the final signals can be delivered to the deviation computer. The conventional circuits can be used for units 470, 480 and 490 as in the standard detonation meter, Model 501–A or Model 501–AP. These meters are made available to the industry from the Waukesha Motor Co., Fuel Research Division, Waukesha, Wis. Waukesha Drawing L–6613–C gives the complete wiring diagram for the above components.

In the construction of FIG. 7, relay armatures 461, 462 are arranged so that when relay 460 is energized these armatures by-pass the resistor assembly 480 and connect unit 470 to unit 490 through a separate resistor 464, which can have a resistance corresponding to the lowest resistor of assembly 480. With this arrangement the energization of relay 460 will assure that the detonation time constant will be the smallest available regardless of the setting which selector assembly 480 may have.

It will be evident from the above that when a compression ratio search is being conducted and a correcting signal from the deviation reduced is of such long duration that motor 12 must run for more than one or two seconds, relay 460 is actuated and remains so until the motor stops running. This greatly accelerates the response of the signals supplied to the deviation computer from the knockmeter and is of considerable value in speeding up the automatic measurement as well as reducing hunting. Without the automatic time constant reduction the signals at the deviation computer may still be responding to the latest compression ratio change when the next compression ratio change is called for. For very small compression ratio changes, however, a long time constant can be tolerated and is even preferred since it gives a more stable indication of a final knock intensity.

Although many different circuit constants can be used in the timing arrangement for relay 450, the following have shown very good results.

Resistor 402—1000 ohms;
Resistor 420—minimum 2500 ohms, maximum 5000 ohms;
Capacitor 412—0.25 microfarad;
Capacitor 452—80 microfarads;
Resistor 450—100 ohms;
Capacitor 427—0.30 microfarad.

Also for the circuit of FIG. 3,

Resistor 240 can be of 10,000 ohms;
Capacitor 242—0.10 microfarad;
Capacitor 282—0.80 microfarad; and
Capacitor 230—0.25 microfarad.

Although control slide wire 94 is shown as part of the combination of FIG. 4, it can be physically located elsewhere and is conveniently a part of unit 90 in FIG. 3. This unit in one practical arrangement is a standard type recorder with a repeater or so-called self-balancing slide wire as in the above-mentioned Minneapolis-Honeywell recorder, or as in U.S. Pat. 3,034,125 granted May 8, 1962.

The sequencer of the present invention need not have the form illustrated in FIG. 3 and a different embodiment is shown in FIG. 8. Here there are two sequence conditions determined by the position of a control arm 500 which is pivoted at 504. Movement of the arm around the pivot is accomplished by a pair of solenoid cores 501, 502 actuated by separate windings and connected together by a rod 506 that has a pin 507 engaged in a slot 508 in the arm. Two different windings 511, 521 are arranged to actuate core 501 to move the arm to the counterclockwise position in which it is illustrated and where it holds a switch 531 closed. A single winding 512 is arranged to move the arm clockwise to a position where it holds a different switch 532 closed. Both switches 531, 532 are of the normally open type so that they remain open unless closed by the arm.

Switch 531 energizes deviation reducing control 24 which can, by way of example, be of the type illustrated in FIG. 4. This control in turn operates a sequence shift 510 as for example when one or several successive timing pulses of the deviation reducing control produces no compression ratio increase or decrease signal. For such operation relay 310 of the construction of FIG. 4 can have an additional armature that closes a switch in a sequence shift energizing circuit each time thyratron tube 301 fires. Switches like 323 and 333, operated by the increase and decrease tubes 302 and 303 respectively but arranged in normally closed condition, are connected in series in the same energizing circuit so that the delivery of either an increase or decrease signal opens the energizing circuit. The sequence shift is accordingly not completed until one or more energizing pulses are delivered to shift unit 510, and indicates that the knock intensity has reached a predetermined standard value.

Actuation of shift unit 510 causes winding 512 to attract core 502 moving the core to the left and thus rotating arm 500 to its clockwise position. This opens switch 531, discontinuing the operation of the deviation reducing control, and closes switch 532 to energize the knock maximizing control 26. Such control can have a simple time actuated cam operated assembly of switches 541, 542 that first lowers the carburetor to the desired minimum fuel-air ratio (switch 541), and then raises it in the intermittent manner described in connection with FIG. 3 (switch 542). Excessive lowering of the carburetor can be prevented by using a minimum position switch that opens the lowering circuit when the desired low level is reached.

Maximizing control 26 is connected to operate a sequence reset unit 522 in the event the knock intensity exceeds the preset standard value before the maximum knock condition is reached. This energizes winding 511 to return arm 500 to the counterclockwise position in which it stops the knock maximizing and starts another compression ratio search through control 24. In the meantime the knock maximizing unit 26 is returned to its starting position as by a return spring 544 that is overcome by the timing drive but takes over when the timing is deenergized.

The second compression ratio search in a sequence will generally be carried out with the fuel-air ratio closer to the final desired value so that at the following knock maximizing step a maximum will be reached at the standard value. If the standard value is again exceeded, however, a third recycle will be effected and this time the desired maximum should be obtained. Rating indicator 30 is then energized to show and/or make a record of the compression ratio and/or antiknock rating. This can be arranged to terminate the operation of the apparatus, or else continue the testing with another fuel sample. In either case rating indicator 30 energizes winding 521 to return the apparatus to compression ratio search condition. Also it can operate a fuel selector shift valve 546 to automatically switch the carburetor to a new fuel supply so that the apparatus automatically continues to measure and indicate antiknock ratings of different samples.

The deviation-reducing control can also have embodiments other than described in connection with FIG. 4. FIG. 9 shows such an alternative modification which is built around a D'Arsonval type meter 550 having a pointer 552 mounted on a pivoting arrangement 554 and balanced so that when not energized the pointer is held against a left-hand stop 556. Current supplied through lead 558 will then cause the pointer to pivot in clockwise direction away from the stop by an amount corresponding to the intensity of the current. Instead of or in addition to the usual meter scale, the meter 550 has a set of arcuate contacts 561, 562, 563, 564, 565, 566, 567, 568, 569 and 570 spaced from each other and extending the length of the arcuate path along which the pointer can travel. Each contact is connected to a separate relay of a set of relays 571, 572, 573, 574, 575, 576, 577, 578, 579 and 580.

The pointer 552 is made of metal or other electrically conductive material and is connected as by lead 582 so that it completes a common return to the energizing circuits for each of the relays 571 through 580. The pointer is normally positioned to move in a plane spaced from the plane in which the contacts 561–570 lie. However, the pointer is quite flexible and a contactor arm 581 connected as an armature of an electromagnet 586 is arranged to bend the pointer over to the plane of the contacts whenever the electromagnet is energized. When the electromagnet is deenergized the contactor is lifted away from the pointer as by a return spring that is not shown.

Each of the relays 571–580 is also connected to close a circuit that energizes compression ratio motor 12. The circuits of relays 571–575 cause the motor to rotate in the direction that increases the compression ratio, while those of relays 576–580 cause it to rotate in the opposite direction. Furthermore relays 575, 576 are arranged to deliver very short pulses of motor-energizing current; relays 574, 577 somewhat longer pulses; relays 573, 578 still longer pulses; relays 572, 579 pulses that are even longer; and relays 571, 580 the longest pulses. Dashpots or other time delay devices can be used to provide the above pulse variations. The longer acting relays such as 571, 572, 573, 578, 579 and 580 can also be connected as by separate contacts to decrease the time constant of the knock amplification circuits.

The meter 550 can be of the general construction available commercially under the name "LIAD multi-contact meter-relay" from Assembly Products, Inc., Chesterland, Ohio, or Desert Hot Springs, Calif. Its arcuate contacts can be so located that there is an appreciable space or dead band 588 between the central pair 565, 566, while the spaces between the other contacts are not as wide as the contact on the pointer. The latter spacing will assure that at least one relay will be operated every time the pointer is pushed into the plane of the arcuate contacts while the pointer is in a rotary position materially removed from the dead band 588.

The apparatus of FIG. 9 is operated by connecting its lead 558 to the output of the knock signal circuit and supplying to its electromagnet 586 a uniformly timed succession of identical energizing pulses. The knock signal circuits and/or movement of the meter 550 are adjusted so that the dead band 588 defines the standard knock intensity. The apparatus will then automatically operate to bring the compression ratio of a test engine to the value that produces standard knock intensity.

A feature of the construction of FIG. 9 is that it can be operated with knock signals of the relatively low level used to operate standard knockmeters so that no further amplification of these signals is needed. In fact meter 550 can even be made to operate with signals in the 1 millivolt range or smaller ranges for which some of the standard amplification used with knockmeters can be eliminated.

The knock maximizing arrangements of the present invention need not be made with a recorder as at 90 in the construction of FIG. 3. The same type of maximizing means can be used with a pulley 98 or similar rotary member driven directly by the compression ratio motor 12, as by means of a drive connection similar to flexible drive 48 in FIG. 2. FIG. 10 shows a different form of knock maximizing device in which two solenoids 601, 602 are operated in opposition to each other with a magnetized armature 604 polarized with respect to the solenoids so that when equal currents pass through the solenoids the armature is balanced between them. For this purpose each solenoid is connected so that current through it causes it to repel the armature. The armature is pivoted as at 606 and carries a flag 608 which, when the armature is balanced, will cover two photoelectric cells 611, 612.

The currents through the respective solenoids 601, 602 are supplied from separate amplifiers shown as vacuum tubes 621, 622 having bias circuits 631, 632 controlled by an alternating sequencer 634. Signals from the knockmeter are supplied to sequencer 634 which is arranged to intermittently deliver the knockmeter signal to the bias circuits 631, 632 in alternate fashion. The sequencer or bias circuits themselves can have a repeater that develops a bias voltage that varies with the knockmeter signal intensity and maintains that bias voltage between the intermittent sequencer steps. A conventional self-balancing bridge that drives a potentiometer tap or slide wire, is suitable for this purpose.

The apparatus of FIG. 10 is connected to a control that effects the raising of the carburetor bowl as in the intermittent manner described in connection with FIGS. 3 and 8. At each of the intermittent raising steps the alternating sequencer 634 applies the knockmeter signal so as to adjust the bias of one of the bias circuits 631, 632. The next intermittent step is applied by the sequencer to the other bias circuit. The raising of the carburetor bowl is carried through at least two steps regardless of the control action of the circuit of FIG. 10. The knockmeter signals will be slightly higher at each step of the sequencer so that the solenoids 601, 602 will be unbalanced at least for the second and subsequent steps so long as the knockmeter readings are increasing. Accordingly the armature 604 will be deflected to one side or the other, exposing one of the photoelectric cells 611, 612. Such exposure is arranged to continue the knock maximizing sequence.

When the knock readings reach a maximum, however, two successive knock readings will be substantially equal and at the second of these steps the armature 604 will be balanced and obscure both photoelectric cells. This de-energizes the sequencer to indicate that the knock maximizing search is completed, and if desired to shift to a new compression ratio search.

Instead of relying on a balancing of the armature, the apparatus of FIG. 10 can be arranged so that the alternating sequencer 634 alternately connects the photoelectric cells 611, 612 to control the discontinuance of the knock maximizing search. With this arrangement increasing knockmeter readings at each step will always cause the armature to be repelled from the solenoid operated at the individual steps. A corresponding switching of the photoelectric cells will accordingly develop alternating search-continuing signals from them. However, when a knock maximum is reached the knock intensity signals will begin to diminish and at the next step the armature will be moved in a direction opposite to that in which it moved during the knock-increasing steps. This movement will be out of step with the switching of the photoelectric cells so that a photoelectric signal of a different type will be obtained and will stop further searching.

The mechanical knock maximizer of FIGS. 4, 5 and 6 can also be operated to stop the maximizing search before the knock intensity signals diminish to any significant degree. For this purpose switch nose 252 can be biased outwardly, that is toward pin 264 by a spring only strong enough to gradually overcome the friction at the mounting pivot 258. With this arrangement rotation of pulley 98 after pin 264 first begins to depress nose 262, will cause the switch to close, after which the nose bias will rotate the switch around pivot 258 between the intermittent rotary steps of pulley 98. Switch 250 will accordingly be closed for only a short period of time at each such step. When the knock intensity reaches a maximum, however, the pulley 98 will not advance and will therefore leave switch 250 open and such open condition can then be used to terminate the knock-maximizing search.

FIG. 11 represents another embodiment of the invention in which a gasoline blending is carried out so as to automatically maintain the finished blend at a preset knock value. At 650 is shown a mixing unit which is supplied by a first blending stream through conduit 651 and a second blending stream through conduit 652. A valve 654 in conduit 652 is arranged to vary the rate at which the second stream is fed into the mixing unit. The blending stream in conduit 652 can be a standard antiknocking concentrate such as the conventional tetraethyllead with or without scavengers and preferably with a stabilizer that keeps the tetraethyllead from decomposing too rapidly as when it is subjected to elevated temperatures. Other additives such as phosphorus-containing compounds and the like can also be present in the concentrate.

The final blend is withdrawn through conduit 656 and can be supplied to delivery lines, storage tanks, tankers, tank trucks or the like. A small bleed line 658 is branched off conduit 656 and supplies an auxiliary carburetor bowl 660 with a small flow of the final blend. A suction tube 662 in the auxiliary bowl 660 is externally threaded so it can be raised or lowered in bowl 660 as by a manually operated or motor driven revolving nut 653 so that the lower tip 655 of the tube establishes the fuel level for feeding fuel to the engine carburetor jet assembly. Tube 662 is raised or lowered to establish the fuel level which results in maximum knock intensity. A by-pass valve 657 can be opened to draw fuel into bowl 660 from a source 659 of reference fuel (prototype), if desired. A small positive displacement pump 665 creates a suction in tube 662 so that all fuel in excess of that required by the engine is removed from the upper portion of bowl 660.

Conventional carburetor bowl assemblies 666, 667 and 663 along with auxiliary bowl 660 can supply fuel through separate feed lines that discharge at a rotary carburetor selector valve 681. Selector valve 681 discharges fuel from the selected carburetor reservoir directly to the engine. Bowls 666 and 667 are supplied with the conventional primary reference fuels used in calibrating the engine for octane ratings. Bowl 663 is supplied fuel from reservoir 659, preferably of a prototype reference fuel of constant composition representing the standard against which the blended stream fuel in line 656 is compared. For automatic blend operation, bowls 666 and 667 need not be used.

Blend control valve 654 can be of the usual remotely controlled type operated by an air motor or by an electric motor 700. This motor is of reversible type with separate windings 701, 702 which determine the direction of rotation. The windings are energized through a disabling relay 705 and a control relay 707, by a deviation-reducing control 710 which can be like that of FIG. 4 or FIG. 9. In the illustrated construction of FIG. 11, the deviation-reducing control 710 includes a set-point slidewire 745 and a control slidewire 749, as in the construction of FIG. 4, with the control slidewire similarly operated in response to the knock intensity signals.

A companion reversible motor 720 similar to motor 700 and also with separate rotation controlling windings 721, 722, is electrically connected for operation by a principal relay 708, and motor 720 is physically connected to operate slidewire 745 to control the setting of its set-point.

A pair of timers and associated secondary relays and switches are connected to energize the above relays and to operate carburetor selector valve 681 through an additional reversible motor 730 which has separate rotation controlling windings 697, 698. Motor 730 also operates switches 781, 782, 791, 792 by rotation of cam 691. A first timer motor 731 includes an arm 733 which it rotates downwardly, as seen in the figure, and which in turn pushes down before it an actuating rod 735 that operates two switch blades 737, 739. Both blades are mechanically biased upwardly, as indicated, so that blade 737 is normally out of engagement with its cooperating contact 741 while blade 739 is in engagement with its cooperating contact 743. Lugs 746 and 748 are arranged on actuating bar 735 so that when the arm 733 moves downwardly, blade 737 engages its contact 741 before blade 739 is pushed away from its contact 743. A solenoid 750 cooperates with arm 733 so that when the solenoid is energized it pulls that arm up to a reset limit which marks the zero point from which timer motor 731 begins operation. Switches 752, 756 each normally closed, are also actuated to open condition by the energization of solenoid 750. Another switch 754 is normally closed but is mechanically forced open when arm 733 returns to the zero point.

A second timing motor 732 is similarly provided with a timing arm 734, actuating rod 736, switch blades 738 and 740, lugs 747 and 749, solenoid 751 and switches 753 and 755.

Switches 761, 762, 763, 764, 765 and 766 of the single pole, double throw variety, are also shown as connected so that by moving these switches to their right-hand positions as shown in FIG. 11, the carburetor bowl motor 730 is connected for automatic operation by relays 693, 695 and the timers 731, 732 to supply the engine fuel from fuel bowl 663 or from auxiliary bowl 660 as needed. In their left-hand positions switches 761 through 766 place the selector motor 730 under the sole control of switches 786, 787 to select fuel from carburetors 666 or 667 as desired. The direction in which motor 730 then operates is determined by switches 786, 787.

Operation of the device as a gasoline stream control is effected by positioning switches 761 through 766 to their right-hand positions as shown in FIG. 11. Closing of the master switch 789 sets the device in operation. Timers 731, 732 must be positioned manually for the initial step. Such switch closing also serves to rotate motor 730 to bring selector switch 681 to the proper carburetor bowl. With timer 731 reset and timer 732 in the timed-out position, the deviation reducing control 710 delivers correcting impulses as needed to carry the set-point of slidewire 745 to a position representative of the antiknock rating of the reference fuel (prototype). These corrective impulses are delivered through the normally open contacts of relay 708 to motor 720 and are not permitted to go to motor 700.

The timing run of motor 731 can be arbitrarily arranged to occupy a period which is adequate for the slidewire 745 to reach its setting. As timing motor 731 approaches the end of this timing run, it first closes switch 737, thereby energizing solenoid 751, relay 707 and relay 695.

Solenoid 751 resets timing motor 732 and temporarily opens switch 753. Relay 707 when energized, opens its armatures without delay, but when deenergized times out through a short delay before reclosing its armatures. This temporarily prevents pulses from deviation reducing control 710 reaching motor 700. Relay 695 supplies power through switches 764, 792, 765 to winding 697 of selector motor 730. This power also charges condenser 699. Motor 730 will operate cam 691 and the carburetor selector valve 681, rotating them until cam 691 actuates switch 792, stopping the flow of motor-energizing current. When switch 792 is so actuated, it also closes an auxiliary circuit that permits discharge of condenser 699 to the winding 698 which acts as a brake on motor 730, causing rotation of cam 691 to stop more rapidly. Carburetor selector valve 681 will have thus been positioned on bowl 660 which can then supply fuel to the test engine. By this time timing motor 731 has gone a little further and opened switch 739 so that motor 731 is stopped. The current to solenoid 751, relay 707 and relay 695 is also stopped by then, and switch 753 accordingly closes. Motor 732 then begins to time out by power supplied through switches 740 and 753. This power also passes through switch 756 to relay 708, which in its actuated position permits deviation reducing control 710 to send correcting impulses to motor 700 through the armatures of delay relay 707 (after it has timed out) and through the armatures of relay 705. Relay 705 is arranged to be always actuated whenever the test engine is running, and acts as a safety to assure keeping valve 654 in its last position should the test engine stop.

During the timing run of timer 732, the signals from the deviation reducing control operate valve 654 and adjust the blending flow from line 652 to the degree required to bring slidewire 749 in balance with slidewire 745. As timer motor 732 approaches the end of its run it first closes switch 738, energizing solenoid 750 to reset timer motor 731 and open switches 752 and 756. It also actuates relay 693 so that motor 730 will be operated by means of an energizing circuit through switches 763, 791, 766 to winding 698 of motor 730, at the same time charging condenser 699. The stopping of motor 730 and cam 691 along with carburetor selector valve 681 then takes place in a manner similar to that described above so that the engine will now operate on prototype fuel through bowl 663.

The reason for opening switch 756 when timer 731 is reset is to deactivate relay 708 so that any impulse from deviation reducing control 710 that might occur after the engine has ceased to operate on stream fuel from bowl 660 will not reposition valve 654.

The above alternate timing steps are then repeated indefinitely and will adjust the blending to the desired antiknock setting.

The suction tube arrangement of FIG. 11 used to maintain the fuel level in carburetor bowl 660 is particularly desirable in that it is simple to construct and operate, yet it gives very accurate results. The excess fuel can be sucked from the bowl at a very rapid rate and a rapid fuel flow can accordingly be used so that changes in the fuel are very rapidly detected notwithstanding the low fuel consumption of the test engine itself.

If it is desired to operate the engine on primary reference fuels or other fuels through bowls 666 and 667, all of the switches 761 through 766 are positioned to their left-hand condition at which time motor 730, cam 691 and carburetor selector valve 681 can be positioned by actuation of switches 786 or 787 to operate the engine on these particular fuels.

Instead of using a rotary selector valve for selecting a fuel supply, other types of arrangements can be made. FIG. 12 shows an arrangement in which separate valves are used with the individual carburetor bowls, and are suitably actuated to effect the desired operation. This figure has one carburetor bowl 660 for the fuel to be tested and another carburetor bowl 663 for a reference fuel, an overflow 862 being provided for carburetor bowl 660.

Each carburetor bowl supplies a feed line 871, 872 that discharges to the engine intake 870. Electrically operated valves 881, 882 in the bowl outflow lines 871, 872 are arranged to automatically select fuel from the individual bowls. In addition secondary valves 891, 892 can be connected to lines 871, 872 so as to drain the respective bowls. Bowl 663 can be kept supplied by a reference fuel of constant composition.

The construction of FIG. 12 operates in a manner analogous to that of FIG. 11, and similar parts are similarly numbered. A set of control switches 851, 852, 853, 854 can be set for automatic or manual operation as shown to actuate individual solenoids 982, 992, 981, 991 for the respective valves 882, 892, 881, 891, and a start switch 886 is provided that also resets timer 731.

Closing of the reset switch 886 sets the device in operation by energizing solenoid 750 along with solenoid 992 and relay 706. (All switches 851, 852, 853 and 854 are first placed in their automatic or left-hand circuit-closing positions.) The energization of solenoid 750 pulls timer arm 733 back to the zero position, thus deenergizing itself by the opening of switch 754. During the time solenoid 750 is energized it also opens switch 752, thus keeping timer motor 731 from operating. When solenoid 750 deenergizes itself it permits switch 752 to close, completing an energizing circuit for timer motor 731 through switch 739. This motor-energizing circuit also actuates solenoid 982 to hold valve 882 open. In the meantime reset switch 886 has been released so that solenoid 992 (along with relay 706) has become deenergized, permitting valve 892 to close. Accordingly carburetor bowl 663 which had been drained through valve 892 while it was open, is now permitted to feed fuel through valve 882 which is opened to the test engine when timer motor 731 starts running. During this operation of the test engine deviation reducing control 710 delivers correcting impulses as needed to carry the set-point of slidewire 745 to a position representative of the antiknock rating of the reference fuel (prototype). Relay 708 is energized so that the correcting impulses are delivered to motor 720 and not to motor 700.

The timing run of motor 731 can be arbitrarily set at a period which is adequate for the slidewire 745 to reach its setting. As timing motor 731 approaches the end of this timing run it first closes switch 737, thereby energizing solenoids 751 and 991 as well as disabling relay 705. Solenoid 751 thereupon resets timing motor 732 while solenoid 991 opens the drain for bowl 660. Solenoid 751 is promptly locked out by the return of timing arm 734 to zero position, and timing motor 732 then begins its run. By this time timing motor 731 has gone a little further and opened switch 739 so that it is stopped, valve 882 is closed and relay 708 is deenergized.

At the commencement of timer motor 732, valve 881 is opened and relay 707 is energized. The test engine is accordingly switched to fuel from bowl 660 while further deviation reducing signals from control 710 are delivered to motor 700 rather than motor 720. Such signals will now operate valve 654 and adjust the blending flow from line 652 to the degree required to bring slidewire 794 in balance with slidewire 745.

As timer motor 732 approaches the end of its run it first closes switch 738 which resets timer motor 731 and opens drain valve 892. A little later timer motor 732 opens switch 740 thereby reaching the end of its run and completing the switch-over to the reference fuel.

The above alternate timing steps are then repeated indefinitely and will adjust the blending to the desired antiknock setting. Relays 705 and 706 can be of the type that when energized, immediately open their switches but only permit the switches to close after some delay. This time delay can be arranged to span the transition period while the fuel shifting is being accomplished up to the time when the new fuel has stabilized itself in the engine intake system.

The apparatus of FIG. 11 (or FIG. 12) can be used with a knock maximizing control and appropriate sequencer where absolute knock values are to be attained. In such event, an automatic or manual check can be made of the set-point of slidewire 745 to make sure that it is correctly positioned for the reference fuel. If it is incorrect then the apparatus needs adjustment, generally to compensate for the drift normally experienced with test engines as they operate. The resetting of the set-points of slidewire 745 by such an automatic or manual check is sufficient compensation in itself, where the resetting is of small extent.

The apparatus of FIG. 11 (or FIG. 12) can also be used to merely check compression ratios with or without a check of fuel-air ratios. To this end the signals delivered to the slidewires 745 and 749 can correspond to the height of the test engine cylinder in its compression ratio adjustment travel, and can be obtained from a differential transformer having a core movable with respect to windings, and coupled to the engine so as to move with the compression ratio adjustment. The windings will show a mutual inductance that varies with the height of the core, and thus will deliver a signal representative of the compression ratio. The set point of slidewire 745 can also be displaced from the position represented by the compression ratio, as by adding to or subtracting from the compression ratio signal a value corresponding to a difference that is to be maintained between the fuel being monitored or blended and a reference fuel. This enables the monitoring or blending to be conveniently carried out with a reference fuel which is not a target fuel but has an antiknock value somewhat off the target value. It is preferred in such a modification to have the compression ratio signals delivered through a spanning potentiometer having a uniform electrical taper so that a specified degree of potentiometer adjustment represents the same antiknock difference everywhere along the potentiometer. A fixed signal similarly adjusted can then be readily added to or subtracted from the output of the spanning potentiometer to provide accurately adjustable operation.

The reference fuel used can be a preformed sample of blend from line 656. When the blending ingredient fed through line 652 is added in only small proportions, as for example when it is the above-mentioned antiknock concentrate, it does not significantly affect the fuel-air ratio required for the final blend to exhibit its maximum knock, and the preformed batch of reference fuel will have substantially the same maximum knock fuel-air ratio regardless of the blending proportions. At the very first timing run the apparatus can be set for that ratio either manually or automatically, and for each timing run after that it is sufficient merely to adjust the blend so that it requires the same compression ratio as the reference fuel (prototype) to reach the same knock intensity. Because no draining of the reference fuel is needed with such an arrangement, as pointed out above, the total quantity of reference fuel needed can be relatively small for a blending operation of long duration. Further decreased in the amount of reference fuel needed can be arranged by adjusting the timer so that two or more final blend tests are made after every reference fuel test.

It is helpful to have sampling line 658 as short as convenient to minimize the flow rate required through it in order for the fuel in bowl 660 to match that in line 656. At the same time the connection from the sampling line 658 to outflow line 656 can be placed down-stream of valve 654 close to the mixing unit 650 so that automatic blending adjustments are promptly detected.

Where the streams fed through lines 651 and 652 are streams of different refinery products such that varying mixtures of them will show maximum knock at different fuel-air ratios, the apparatus of FIG. 11 (or FIG. 12) can be expanded to include the entire test assembly of FIG. 3 with the sequencer automatically reset by the timer motors 731, 732. Also the carburetor bowls 660 and 663 can in this arrangement have their heights separately adjustable so that the adjustment of one to maximum knock will not affect the adjustment of the other.

One highly practical arrangement is to have the automatic fuel-air ratio adjustment connected to automatically go through one such adjustment when a blending control is initiated, the blending control then continuing indefinitely with only the compression ratio or the knock intensity automatically controlling the blending. In the event of a process upset or other significant change in any of the refinery streams fed to the blender, there is ample notice and the blending control apparatus can be manually or automatically re-initiated so that another fuel-air ratio search is effected. If desired the apparatus can be arranged to go through two fuel-air ratio searches when it is placed in operation, one such search for the blend fuel and the other such search for the reference or prototype fuel. During the remainder of the blending control, which can extend for many days, the apparatus can merely control the blending to keep the compression ratio at the desired level when the engine is operating on the blend fuel, with an occasional shift to the reference or prototype fuel to check on the desired compression ratio level.

It may also be desirable to apply a positive temperature control to the fuel fed to the test engine, as for example to compensate for heating by the valve solenoids 881, 882, 891 and 892. The continuous operation of one of these solenoids usually generates appreciable heat. The fuel lines adjacent these solenoids, or the solenoids themselves, may accordingly be jacketed with liquid flow passages through which is circulated a cooling liquid such as water or overflow fuel. The motor-driven rotary selector valve of FIG. 11 does not need cooling. Cooling is also helpful to reduce evaporation of the lighter fractions of the fuels and the measuring errors that can thus result. A small refrigerating unit is particularly helpful and can keep the fuels supplied at a substantially constant low temperature.

The reading of the control slidewire 794 with or without that of slidewire 745, can be shown in a display window as described above in connection with FIG. 2, or it can be printed out, photographed, or recorded as by continuous or intermittent recording. It can also be transmitted to remote locations for monitoring purposes. Analog or digital forms of the readings can be used for such transmission, and if desired digital forms can even be used for the control operations.

The sequencers of the present invention provide for each control function or step to go to completion regardless of the time required for moving to the next position and control function. Also at each step the switching action will take place without unnecessarily extending the time required for a given control function. Different fuels or gasolines react at different rates to changes in compression ratio and/or fuel-air ratio, and the sequencers of the present invention make the various adjustments as quickly, if not more quickly, than is possible manually.

The sequencer of FIG. 3 can also be connected to a fuel selector shift mechanism that shifts the supply of fuel to the engine 10 from one source to another, as for example by having a separate bowl and float valve combination for each source. One convenient form of shift mechanism includes a multi-position rotating plug selector valve linked to a stepping solenoid and arranged so that when the sequencer reaches position 7 it delivers a pulse of current to the solenoid and causes the valve to step around a circular path. At each step the selector valve closes one supply line and opens another. Six or eight steps or more can be provided in this circular path before the valve returns to its original position so that a corresponding number of fuels can be selected automatically. One or more of the fuels can be a reference fuel having a known antiknock rating so that the operation of the equipment can be checked.

It is a feature of the present invention that because the apparatus will operate automatically, it can in any measurement be arranged to go through as many sequences as necessary to reach a standard knock intensity as accurately as desired. By increasing the accuracy of this procedure, the need for comparison with standard fuels is greatly diminished. Occasional comparisons of this type will still be desirable in order to indicate when the engine or other components have drifted away from the desired operating characteristics and need correction or maintenance. Setting the high limit switch just above but close to the standard knock intensity position will materially increase the accuracy.

As discussed above, very good automatic knock measurement is obtained with the compression ratio correction pulses that increase in length as the knock intensity signals depart further from the desired standard. An exactly proportional variation between the correction pulse length and the departure from standard, so that doubling the departure doubles the pulse length, is highly effective but the pulses can increase in length faster or slower than this. It is preferred, however, that the pulse length increase at least about 10% as fast as the signal departures from standard, and that they increase no more than about twice as fast as the departures, inasmuch as this range provides most rapid automatic operation with little or no hunting and with signal intensity checks made as frequently as one per ten seconds. Other checking frequencies can also be used to advantage, particularly with the higher rates of pulse length variation as compared to signal strength changes.

Carburetor level raising is best accomplished in small steps about 5 to 10 seconds apart and preferably about 8 seconds apart, although the steps can be as little as one-tenth millimeter and as much as five-tenths millimeter each. The length of time taken for each step should be held to the minimum, preferably not over two seconds.

The above conditions apply both to the antiknock testing as with the apparatus of FIG. 3, as well as to the simpler compression ratio adjustment desired as a preliminary step to use of the apparatus illustrated in FIG. 11.

The apparatus of FIG. 11 (or FIG. 12) can also be arranged to control the operation of refinery units such as alkylation, platforming, hydroforming, reforming, catalytic cracking, etc., instead of blending. By connecting motor 700 so that it adjusts the critical controls to such apparatuses in accordance with the test measurements, they can be positioned to produce fuel stocks of the required antiknock quality. When making a test on a fuel, it is helpful to make sure that all gas bubbles are removed from it before it reaches the set level. Flowing streams are more apt to contain such bubbles, and the venting of the bowl 660 effectively removes them.

Instead of using an electrically energized motor to directly operate the blending valve, the motor can merely operate an air valve that raises the air pressure in a control conduit. This conduit can then be used to control an air-operated blending valve. Because of the greater safety inherent in air operation for valves in a refinery or blending unit, this type of control is very desirable. Additional blending details are set forth in application Ser. No. 377,192, the entire contents of which are incorporated herein.

It is also desirable to compensate antiknock rating or comparison results in accordance with variations in barometric pressure. This can be accomplished by merely having a recording of the barometric pressure at the time each test is carried out. Barometric pressure recording can be separately made by conventional barographs and any correction applied by separate calculation from the rating results expressed in compression ratio figures, or in the micrometer setting or compression ratio indication of the cylinder which is the value officially listed in the ASTM Manual.

As an alternative technique, the air intake for the test engine of the present invention can be arranged to be supplied with air at the standard barometric pressure so that no correction is needed and the rating is then read directly from the compression ratio indicated by the rating indicator of the apparatus. For this purpose the air intake of the test engine is connected to a compartment of fairly limited size, which compartment in turn is open to the outside air pressure through a limited passageway. A barometric switch in the compartment is connected with a damper or the like to throttle down the opening to the outside air pressure whenever the pressure in the compartment rises above standard. The compartment is also in communication with the discharge end of a blower which is actuated to increase the pressure within the compartment when the barometric switch shows that the pressure within the compartment is falling below standard.

When air at standard barometric pressure is used it will be advisable to pressurize the fuel reservoirs and sight glasses to the same degree to prevent discharge of the fuel from vent holes.

The deviation-reducing control of the present invention can have forms other than those referred to above. The deviation can, for example, be computed mechanically as by causing the detonation signals to compress a spring balanced by a second spring which is given a predetermined standard compression, a pole of a double-throw switch being held between the springs so that it trips in a different direction, depending upon which of the spring compressions is the greater one. Magnetic balancing can also be similarly effected.

The various types of apparatus described above can be made resistant to corrosive and other harmful environments as by potting the entire wiring in a chemically resistant resin such as an epoxy resin, or by soldering the wiring with silver solder or similar highly corrosion-resistant compositions.

Obviously many other modifications and variations of the present invention are possible in the light of the above teachings. It is, therefore, to be understood that within the scope of the appended claims the invention may be practiced otherwise than as specifically described.

What is claimed is:

1. A method for determining the difference in octane quality between a prototype gasoline of known octane quality and a test gasoline of similar composition but of unknown quality which comprises passing alternately said test and prototype gasolines through a spill-type carburetor of low gasoline holdup into a standard ASTM knock engine while maintaining a constant air-to-fuel ratio adjustment, measuring alternately the knock intensities of said gasolines, and converting the engine-knock intensities alternately obtained from the two gasolines into a difference in octane quality between said gasolines.

2. A method for determining the difference in octane quality between a prototype gasoline of known octane quality and a test gasoline of similar composition but of unknown quality which comprises passing alternately said test and prototype gasolines through a fuel chiller to adjust said gasolines to substantially the same temperature, passing alternately said chilled gasolines through a spill-type carburetor of low gasoline holdup into a standard ASTM knock engine while maintaining a constant air-to-fuel ratio adjustment, measuring alternately the knock intensities of said gasolines, and converting the engine-knock intensities alternately obtained from the two gasolines into a difference in octane quality between said gasolines.

3. A method for determining the difference in octane quality between a prototype gasoline of known octane quality and a test gasoline of similar composition but of unknown octane quality which comprises passing alternately said test and prototype gasolines through a fuel chiller to adjust said gasolines to substantially the same temperature, passing alternately for periods said chilled gasolines through a spill-type carburetor of low gasoline holdup into a standard ASTM knock engine while maintaining a constant air-to-fuel ratio adjustment, measuring alternately the knock intensities of said gasolines with a 501–A detonation meter having a time-controlled switch for switching from a smaller to a larger time constant at the desired time in each period, and converting the knock intensity measurements into a difference in octane quality between said gasolines.

4. A method for continuously controlling the octane quality of a line gasoline for spark-ignition engines which comprises passing alternately said line gasoline and a prototype gasoline of composition similar to the line gasoline and of known octane quality through a spill-type carburetor of low gasoline holdup into a standard ASTM knock engine while maintaining a constant air-to-fuel ratio adjustment, measuring alternately the knock intensities of said gasolines converting the knock intensities alternately obtained from the two gasolines into a difference in octane quality between the line and prototype gasolines, and automatically taking corrective measures to adjust the octane quality of the line gasoline where the difference in octane quality between line and prototype gasoline exceeds a specified limit.

5. A method for continuously controlling the octane quality of a finished commercial gasoline at the point at which the gasoline stocks and antiknock additive are blended which comprises passing alternately the finished commercial gasoline coming from the blender and a prototype gasoline of composition similar to the finished gasoline and of known octane quality through a fuel chiller to adjust said gasolines to substantially the same temperature, passing alternately said chilled gasolines through a spill-type carburetor of low gasoline holdup into a standard ASTM knock engine while maintaining a constant air-to-fuel ratio adjustment, measuring alternately the knock intensities of said gasolines, converting the knock intensities alternately obtained from the two gasolines into a difference in octane quality between the prototype and finished gasoline, and automatically changing blending conditions where the difference in octane quality exceeds a specified limit.

6. An octane comparator for determining the difference in octane quality between a prototype gasoline of known octane quality and a test gasoline of similar composition but of unknown octane quality comprising means for alternately supplying the prototype and test gasolines according to a programmed time cycle to a single spill-type carburetor of low fuel holdup, means for controlling the temperature of both the prototype and test gasolines so they enter the carburetor at substantially the same temperature, means for alternately measuring the knock intensities of said prototype and test gasolines in a standard ASTM knock engine, and means for converting said knock intensities into a difference in octane quality between said prototype and test gasolines.

7. An octane comparator for determining the difference in octane quality between a prototype gasoline of known octane quality and a test gasoline of similar composition but of unknown octane quality comprising means for alternately supplying prototype and test gasolines for a time period on each gasoline to a single spill-type carburetor of low fuel holdup, means for controlling the temperature of both the prototype and test gasolines so they enter the carburetor at substantially the same temperature, means for alternately measuring the knock intensities of said prototype and test gasolines in a standard ASTM knock engine, means for averaging the knock-intensity measurements with a long time constant so that the knock-intensity measurement is in effect an average of preceding engine cycles, means for alternately measuring the knock intensities of each gasoline only at the desired time in each period, and means for converting said knock intensities into a difference in octane quality between said prototype and test gasolines.

8. An octane comparator for continuously controlling the octane quality of a line gasoline for spark-ignition engines comprising means for alternately supplying said line gasoline of unknown octane quality and a prototype gasoline of known octane quality and composition similar to said line gasoline to a single spill-type carburetor of minimum fuel holdup, means for controlling the temperatures of both the prototype and test gasolines so they enter the carburetor at substantially the same temperature, means for alternately measuring the knock intensities of said prototype and line gasolines on a standard ASTM engine, means for converting said knock intensities into a difference in octane quality between said prototype and test gasolines, and means for automatically adjusting the octane quality of the line gasoline where the difference in octane quality between line and prototype gasoline exceeds a specified limit.

9. An octane comparator for continuously controlling the octane quality of a finished commercial gasoline at the point where lead alkyl is blended with the gasoline stock comprising means for alternately supplying the commercial gasoline-lead alkyl blend of unknown octane quality and a prototype gasoline of known octane quality and composition similar to the commercial gasoline to a single spill-type carburetor of minimum fuel holdup, means for controlling the temperatures of both the prototype and commercial blended gasolines so they enter the carburetor at substantially the same temperature, means for alternately measuring the knock intensities of said prototype and commercial blend gasolines on a standard ASTM engine, means for converting said knock intensities into a difference in octane quality between said prototype and commercially blended gasolines, and means for adjusting blending conditions where the difference in octane quality between line and prototype gasoline exceeds a specified limit.

10. An apparatus for monitoring the knock characteristics of a stream of fuel, said apparatus including a detonation testing engine, a measuring system connected to indicate the intensity of detonation knocking that takes place in the engine and adjusting mechanism connected for automatically adjusting the compression ratio of the engine to keep the detonation intensity at a predetermined value, sampling means connected to receive samples of fuel and deliver them to the engine for continuous combustion therein at maximum knock fuel-air ratio, the sampling means being further connected to deliver to the engine samples of a reference fuel for continuous combustion therein at maximum knock fuel-air ratio, the adjusting mechanism being connected to cause the sampling means to automatically shift from one fuel to the other and back again.

11. The combination of claim 10 in which the adjusting mechanism is also connected to automatically bring the sampling means to the condition in which the fuel it delivers to the engine is at maximum knock fuel-air ratio, and then hold the sampling means in that condition.

12. The combination of claim 10 in which the engine is an ASTM engine.

13. The combination of claim 10 in which the sampling means includes a temperature control to compensate for heating of the fuel.

14. The combination of claim 11 in which the adjusting mechanism is connected to go through an automatic sequence in which it first adjusts only the compression ratio of the engine to bring the detonation intensity to a predetermined value, then adjusts only the fuel-air ratio for the fuel on which the engine operates so that it is at the maximum knock ratio, and finally continues to operate by adjusting only the compression ratio.

15. The combination of claim 14 in which the adjusting mechanism is connected to carry out the fuel-air ratio adjusting step by first reducing that ratio to a very low value and then increasing the ratio in small increments until the knock intensity just goes through a maximum.

16. The combination of claim 11 in which the adjusting mechanism includes cycling elements connected to cause the adjusting mechanism to go through a maximum knock fuel-air ratio sequence before commencing the compression ratio control, and then completing the compression ratio control without further fuel-air ratio changes.

17. An apparatus for monitoring the knock characteristics of a stream of fuel, said apparatus having a single knock-testing engine and automatic knock measuring and comparing structure connected to the engine to cause the engine to run on the fuel from said stream and compare its knock characteristics with a passive reference, the automatic structure including sequencing means connected to periodically cause the engine to run on a comparison fuel instead of the stream fuel and during such periods to adjust the reference to compensate for changes in the engine's characteristics.

18. The combination of claim 17 in which the engine has two separate fuel-air mixture supplies, each with a separate fuel-air ratio adjustment.

19. An apparatus for monitoring the knock characteristics of a stream of fuel, said apparatus having a knock-testing engine and automatic knock measuring and comparing structure connected to the engine to cause the engine to run on the fuel from said stream and compare its knock characteristics with a reference, the automatic structure including sequencing means connected to periodically cause the engine to run on a comparison fuel instead of the stream fuel and during such periods to adjust the reference to compensate for changes in the engine's characteristics, and cooling means connected to cool the fuel supplied to the engine.

20. The combination of claim 17 in which the apparatus also includes a control assembly connected to the automatic structure for automatically varying the knock characteristics of the fuel in the stream, and automatic holding means connected to the knock-testing engine and the control assembly for disabling the control assembly when the knock-testing engine is not running.

21. A process for monitoring the knock characteristics of a stream of fuel, which process comprises continuously operating a variable-compression test engine on a reference fuel at its maximum knock fuel-air ratio, then shifting the engine operation from said fuel to continuous operation on the stream of fuel at its maximum knock fuel-air ratio, and adjusting the compression of the engine to keep it knocking at a predetermined intensity.

22. The combination of claim 21 in which the fuel is passed through a cooler before it is supplied to the engine.

References Cited

UNITED STATES PATENTS

| | | | |
|---|---|---|---|
| 3,383,904 | 5/1968 | Jones et al. | 73—35 |
| 3,469,954 | 9/1969 | Hoffman | 44—2 |
| 3,485,598 | 12/1969 | Jones et al. | 44—2 |

PATRICK P. GARVIN, Primary Examiner

U.S. Cl. X.R.

73—35; 137—88, 93

PO-1050
(5/69)

UNITED STATES PATENT OFFICE
CERTIFICATE OF CORRECTION

Patent No. 3,690,851                    Dated September 12, 1972

Inventor(s) John T. Jones et al

It is certified that error appears in the above-identified patent and that said Letters Patent are hereby corrected as shown below:

Column 1, line 42, insert a comma after "embodiments

Column 1, line 72, "from" should read -- for --

Column 3, line 6, "applied" should read -- supplied --

Column 7, line 27, "sereis" should read -- series --

Column 8, lines 45-46, "derivation" should read -- deviation --

Column 11, line 71, "reduced" should read -- reducer --

Column 15, line 31, "nose 262" should read -- nose 252 --

Column 15, line 50, "antiknocking" should read -- antiknock --

Column 20, line 4, "decreased" should read -- decreases --

Signed and sealed this 13th day of February 1973.

(SEAL)
Attest:

EDWARD M. FLETCHER, JR.                ROBERT GOTTSCHALK
Attesting Officer                      Commissioner of Patents